Figure 1:
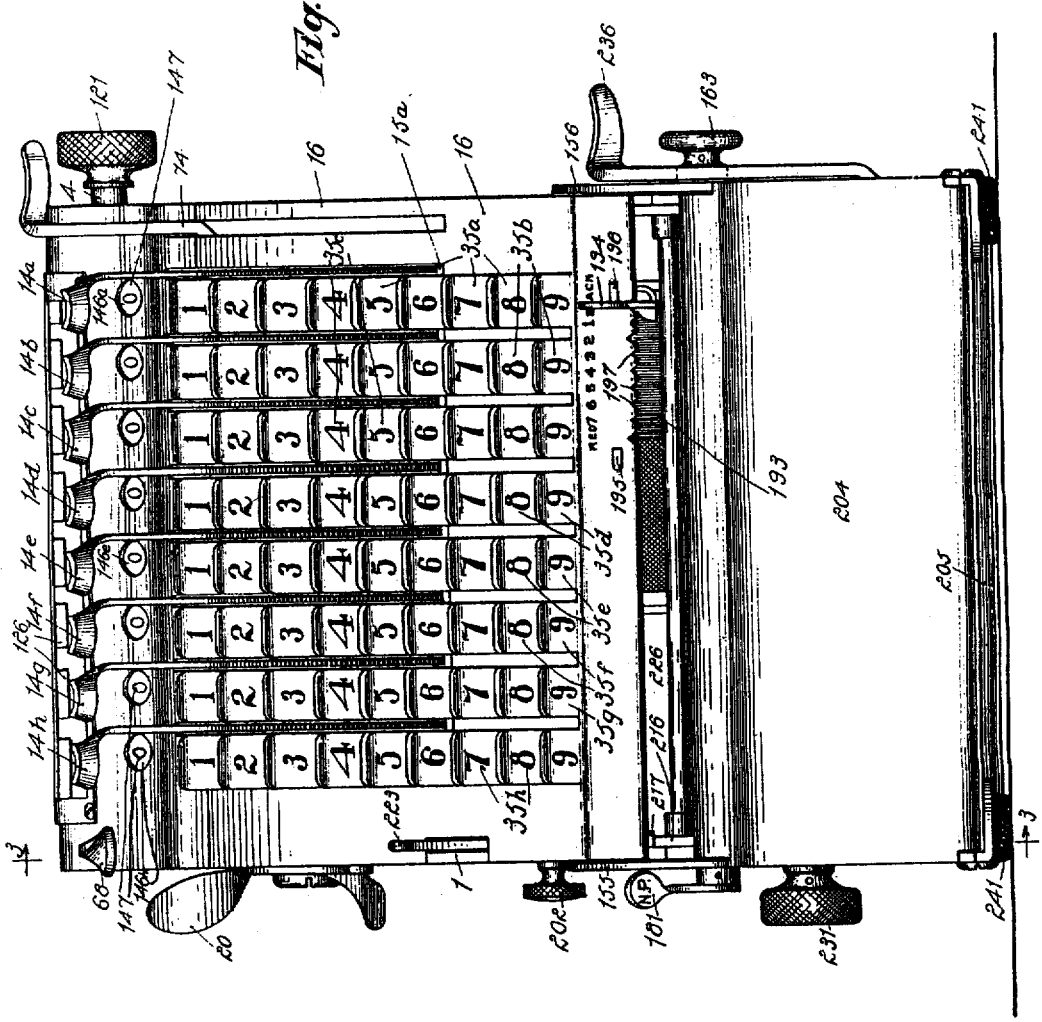

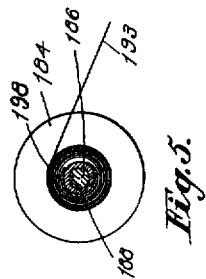
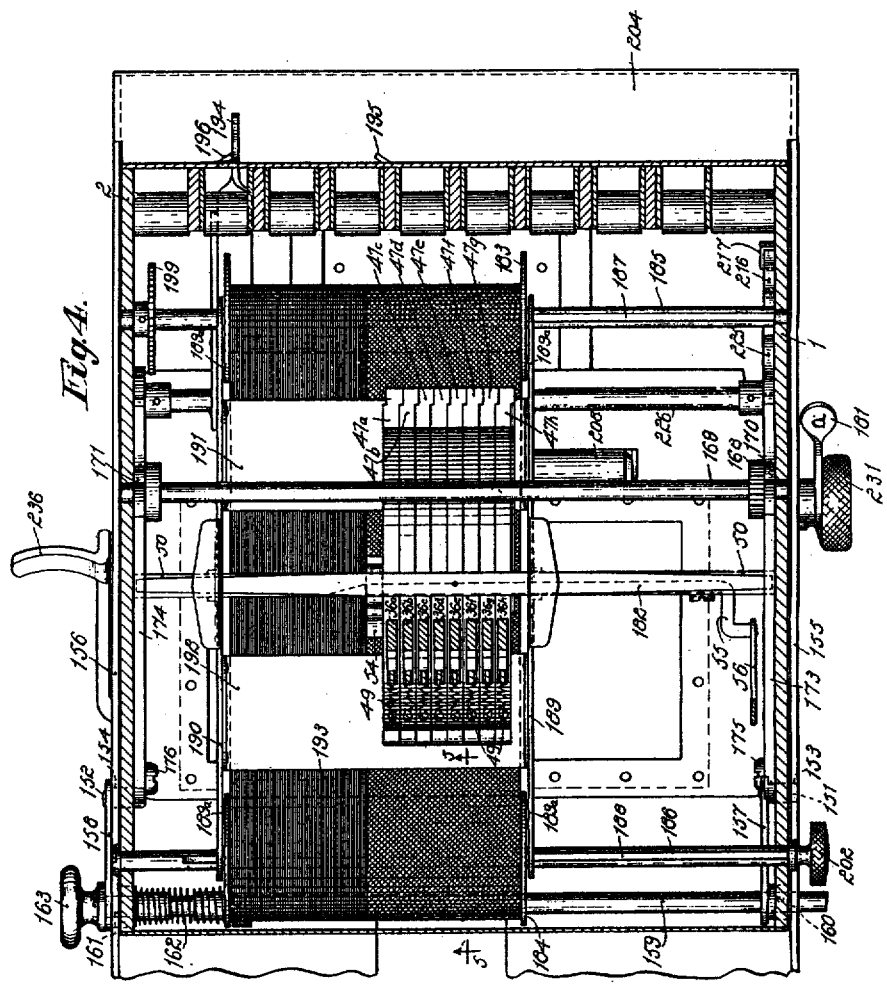

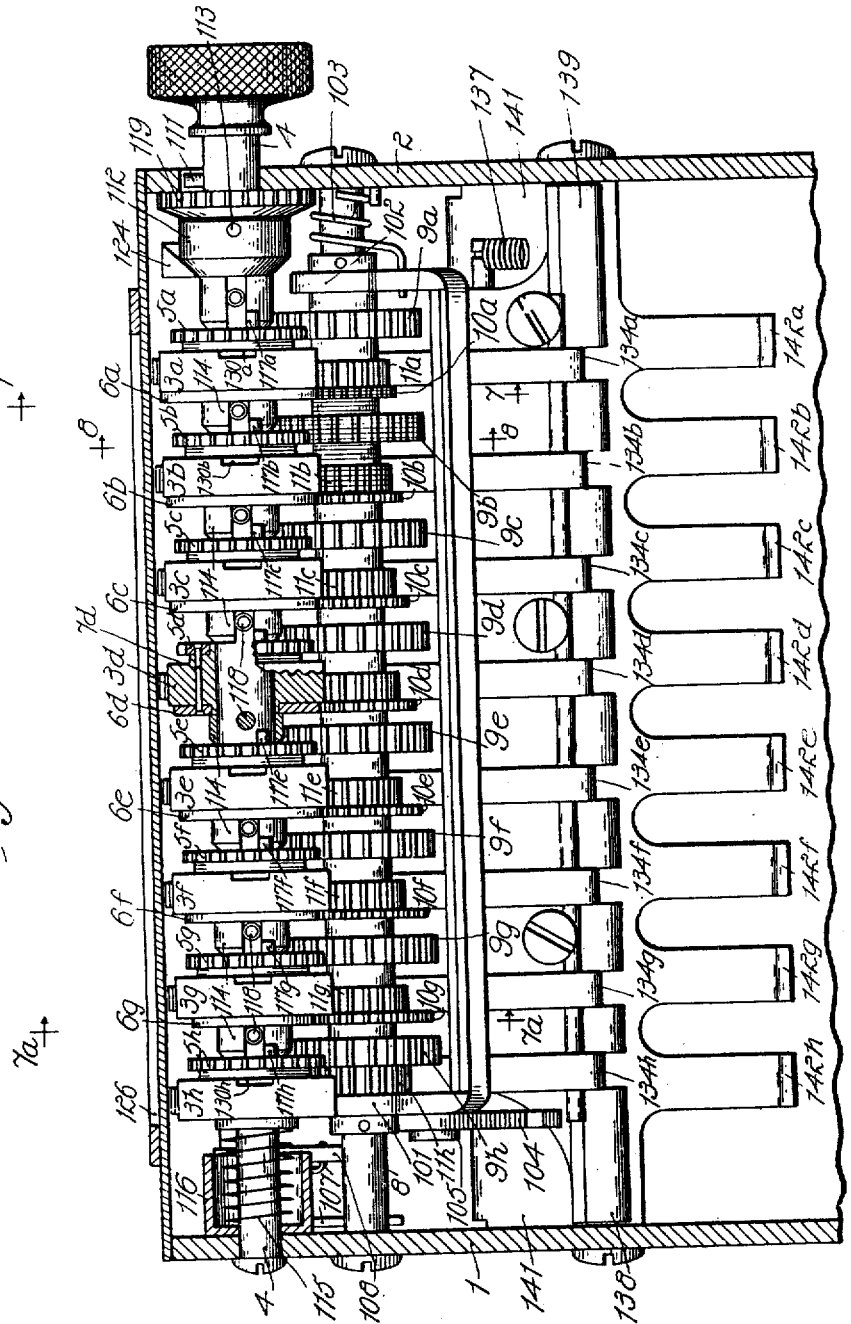

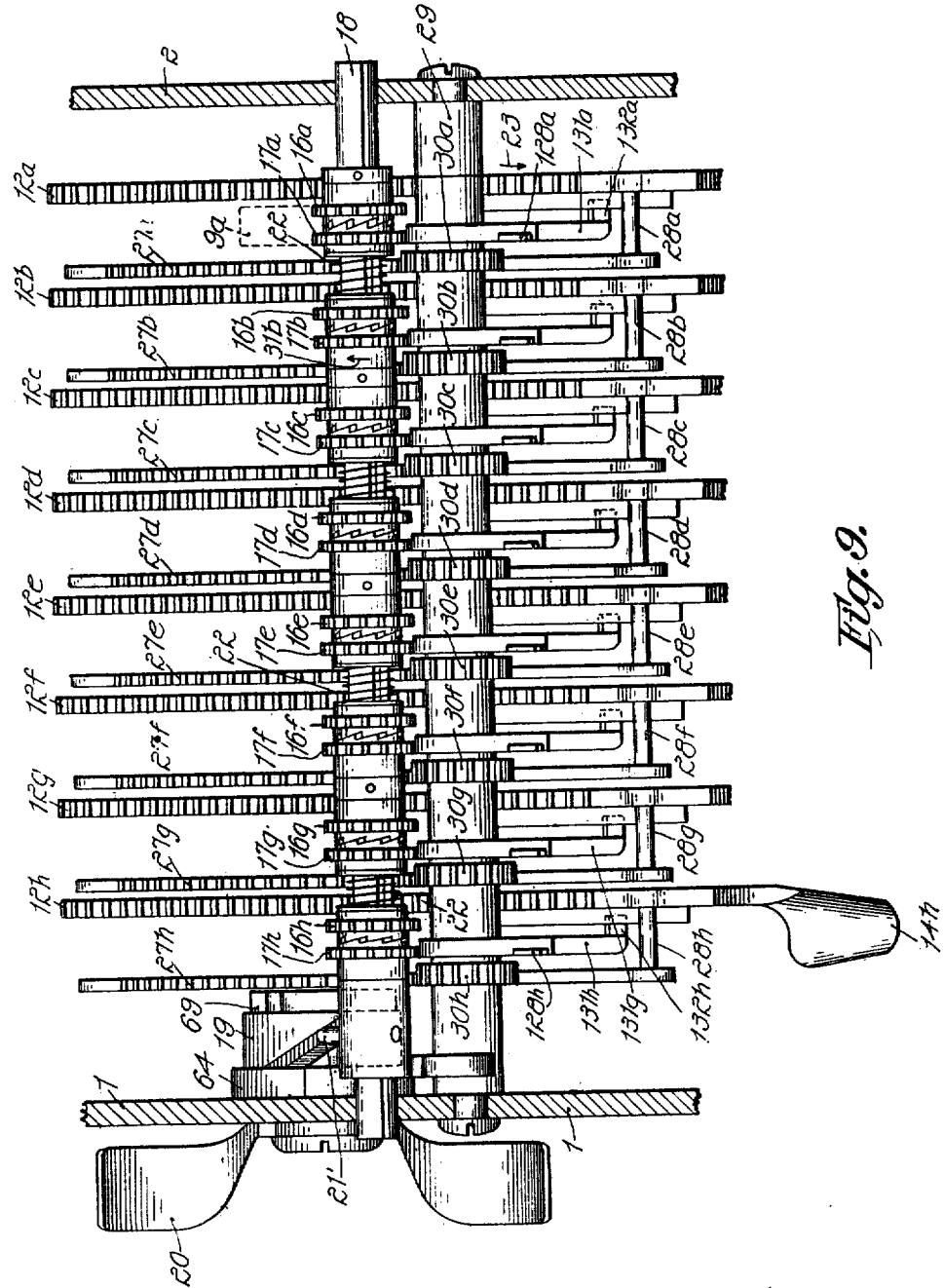

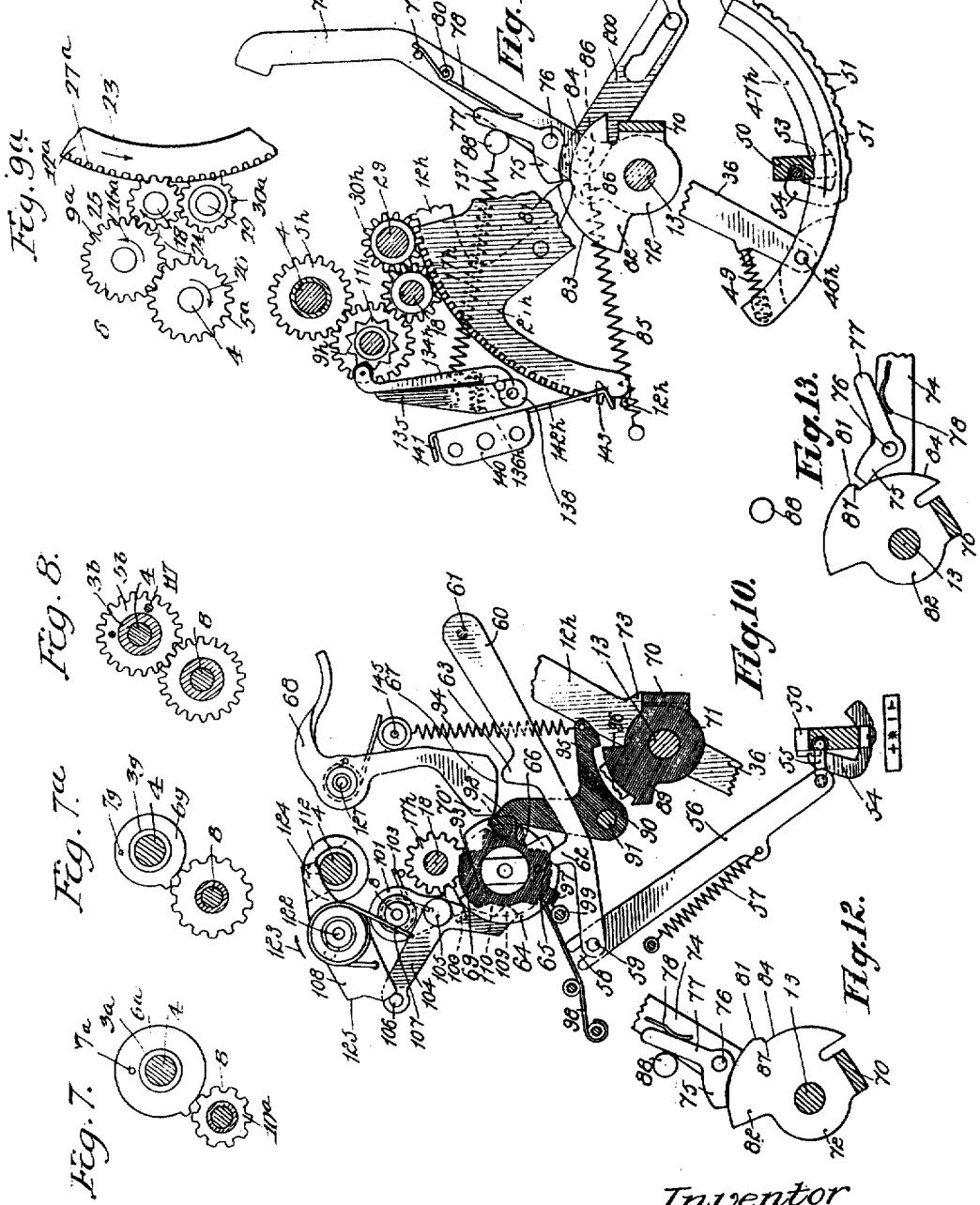

F. O. HEUSER.
CALCULATING MACHINE.
APPLICATION FILED NOV. 4, 1912.
1,239,598.
Patented Sept. 11, 1917.
14 SHEETS—SHEET 8.
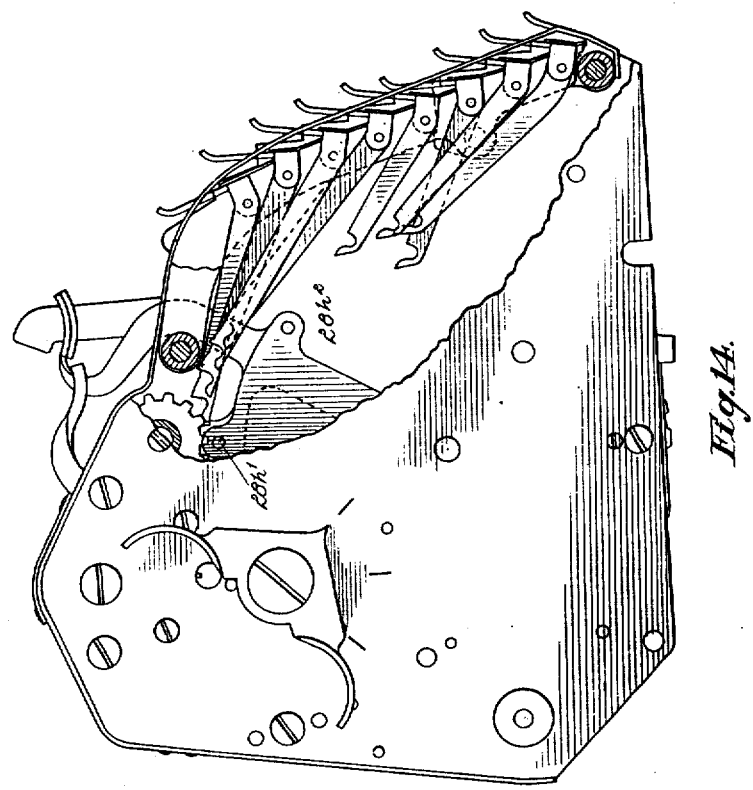
Witnesses:
Robert F. Brach
Leslie W. Frick
Inventor
Frederick O. Heuser
By Brown & Williams
Attorneys

F. O. HEUSER.
CALCULATING MACHINE.
APPLICATION FILED NOV. 4, 1912.

1,239,598.

Patented Sept. 11, 1917.
14 SHEETS—SHEET 9.

Witnesses:
Robert F. Bracke
Leslie M. Fricke

Inventor
Frederick O. Heuser
By Brown & Williams
Attorneys

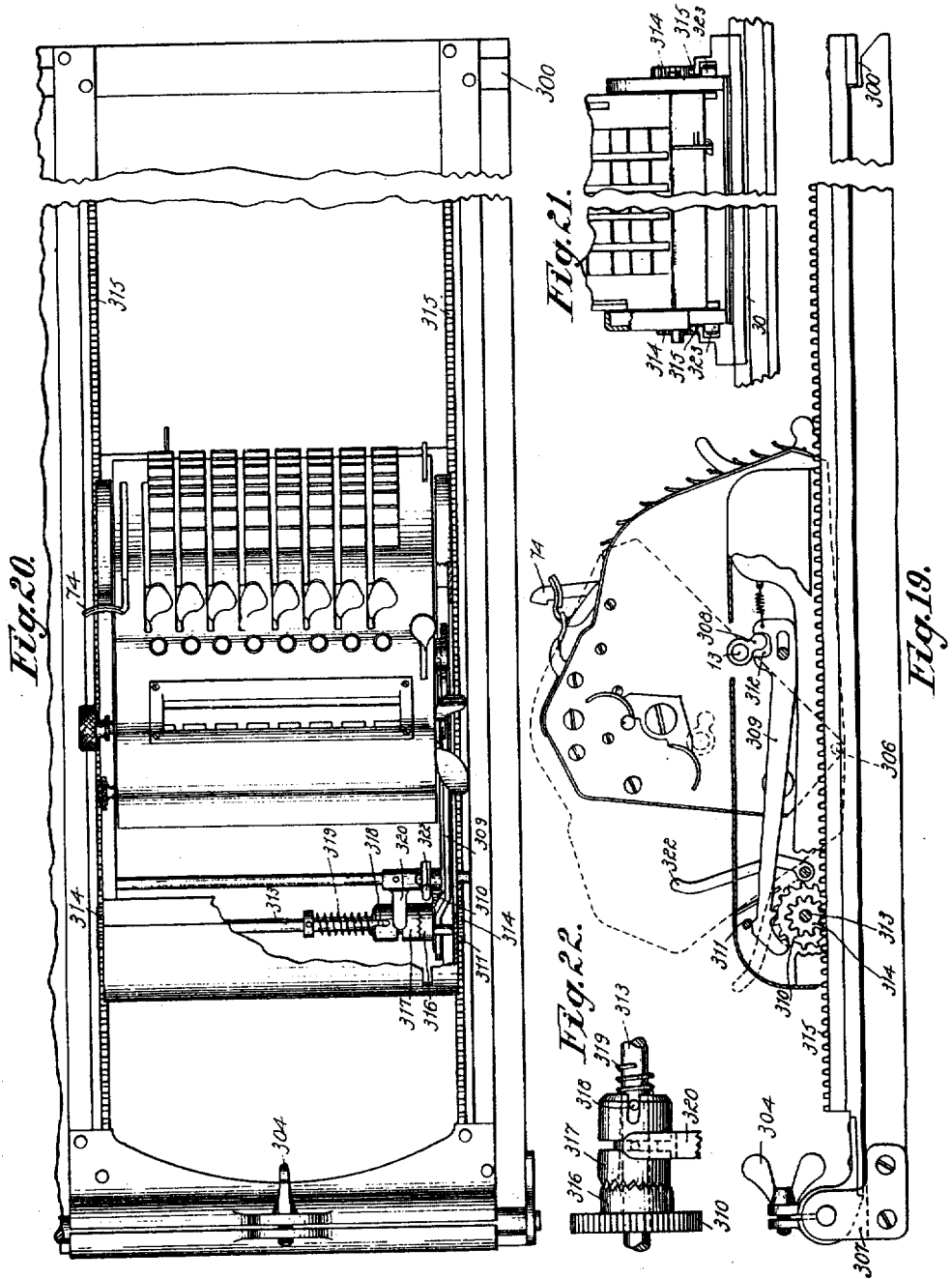

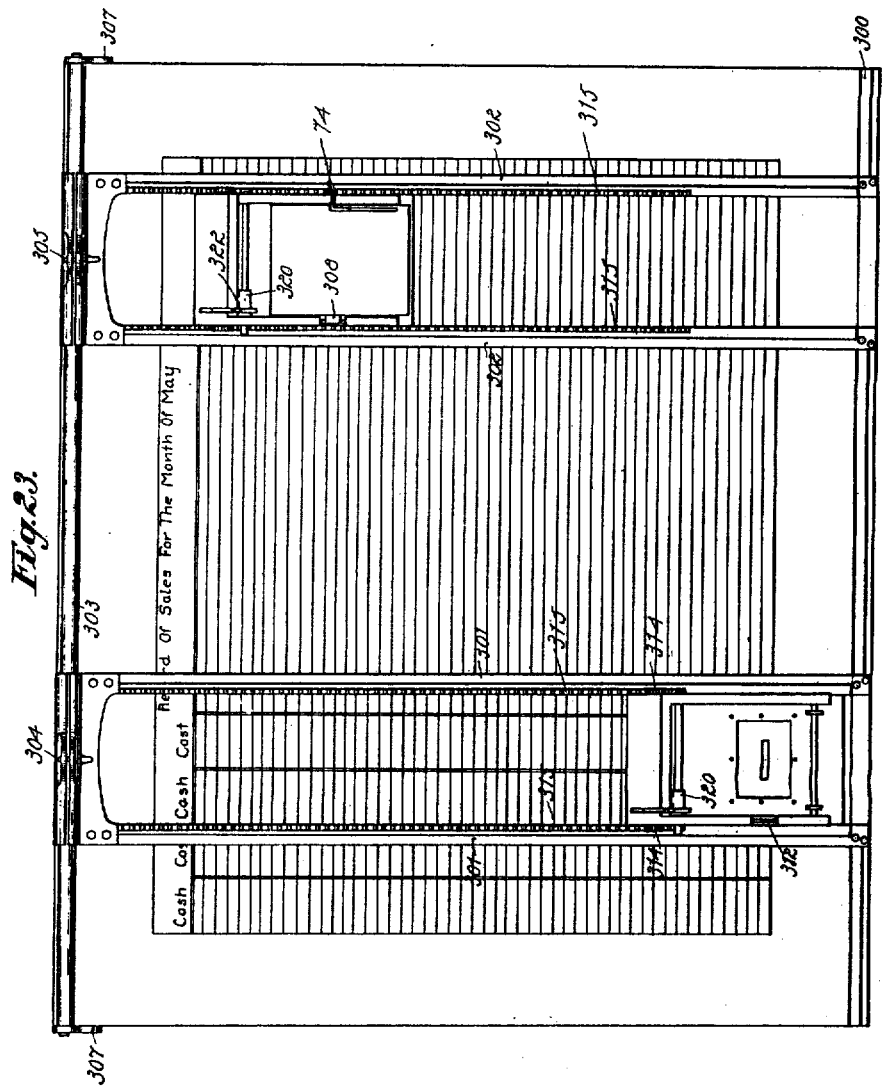

F. O. HEUSER.
CALCULATING MACHINE.
APPLICATION FILED NOV. 4, 1912.

1,239,598.

Patented Sept. 11, 1917.
14 SHEETS—SHEET 13.

Witnesses:
Robert F. Bracke,
Leslie W. Fricke

Inventor
Frederick O. Heuser
By Brown & Williams
Attorneys

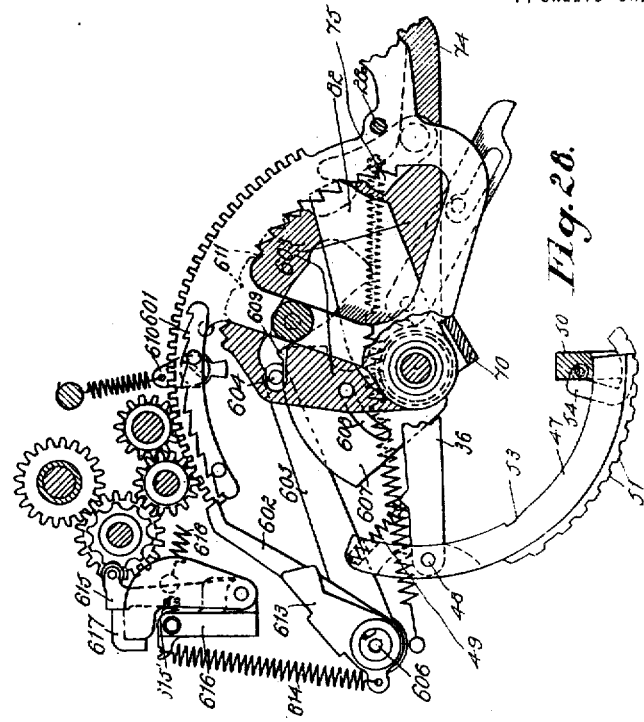

UNITED STATES PATENT OFFICE.

FREDERICK O. HEUSER, OF CHICAGO, ILLINOIS.

CALCULATING-MACHINE.

1,239,598.   Specification of Letters Patent.   Patented Sept. 11, 1917.

Application filed November 4, 1912. Serial No. 729,485.

Be it known that I, FREDERICK O. HEUSER, a citizen of the United States, residing at Chicago, in the county of Cook and State of Illinois, have invented certain new and useful Improvements in Calculating-Machines, of which the following is a full, clear, concise, and exact description, reference being made to the accompanying drawings, forming a part of this specification.

My invention relates to calculating machines of the class now generally known as adding machines. My invention provides a machine unusually well adapted to carry on promiscuous operations of addition and subtraction, and it may be used for a great variety of calculations besides those mentioned.

It is one of the objects of the present invention to provide a machine capable of carrying on all of the calculations effected by the commercial machines now upon the market, and at the same time to reduce the complication and cost of manufacture to a point such that the machine may be sold at but a fraction of the price now charged for commercial adding machines.

Generally the machine of my invention comprises, first, the more strictly calculating mechanism in conjunction with its operating or actuating mechanism, and, second, the paper-holding or feeding mechanism upon which the data and the results of the calculations are printed. My invention provides a calculating machine proper, which may be applied to any one of several forms of paper-holding and feeding mechanisms. It provides also, an interchangeable set of paper-holding or feeding mechanisms, with any one of which the more strictly calculating mechanism may be operatively associated. This rather complete mechanical separation of the calculating mechanism from the paper-holding and feeding mechanism, results in a number of advantages which will more fully appear in connection with the detailed description of the various forms of paper-holding and feeding mechanism. I have illustrated paper-holding and feeding mechanism adapted to feed a narrow strip of paper upon which numbers to be added and subtracted may be listed, and upon which the total may be imprinted. I have shown, also, a platen adapted to shift both sidewise and vertically relative to the imprint of the calculating mechanism, this mechanism being such as to permit the use of paper sheets of any desired size or shape. I have illustrated, further, a form of platen such that the calculating machine may be made to imprint a record of its operations upon the pages of a book, or other flat lying sheet of paper. It is one of the advantages of my invention that the calculating part of the mechanism may be thus applied to these various forms of paper-holding and feeding mechanisms.

The more strictly calculating machine part of the device, includes a reversible totalizing register, containing numeral wheels and carry-over mechanism. Associated with the register, is a register actuating mechanism. Generally stated, the actuating mechanism comprises a series of actuating sectors, one for each numeral wheel of the register. Each actuating sector is provided with a lever, by means of which the sector may be swung about a pivot a greater or less distance as may be necessary to determine the number of unit spaces to which the associated register numeral wheel is to be rotated. Between the actuating sectors and the numeral wheels of the registers, is located a set of reverse gears, which, when in one position, inter-connect an actuating sector and its numeral wheel in a manner such that the numeral wheel will be rotated in the forward direction during the swing of the actuating sector, and which when in the other position establish a reverse interconnection such that the forward swing of the actuating sector will cause a backward rotation of the associated numeral wheel, as necessary in the act of subtraction. The amount of the swing of each actuating sector is determined by a stop, or set of stops, manually operated in conformity with the numbers to be accounted for in the totalizing register.

Briefly stated, a "set-up" is made by manually swinging the actuating sectors of the appropriate orders to more or less advanced positions as determined by the manipulation of the stops associated with the several actuating sectors. The device of my invention is such that the numeral wheels of the totalizing register are actuated positively and directly during the forward swing of the actuating sectors as takes place in effecting the set-up. As will more fully appear also, the carry-over mechanism is arranged to effect the necessary carry-overs simultaneously with the positive forward actuation of the numeral wheels of the register. By shifting the intermediate gearing into the "subtracting" position, a correspondingly positive and direct actuation of the numeral wheels of the register is secured, the reverse carry-overs being effected simultaneously with the direct actuation of the numeral wheels.

In order to effect the printing of the numbers which are entered in the totalizing register, I provide a printing segment in conjunction with each actuating sector. The several actuating sectors are swung into their more or less advanced positions in conformity with the number to be added or substracted, thus bringing the appropriate types of the printing segments into a printing position such that a subsequent operation will cause the number to be printed in one operation. The printing is effected by a slight downward movement of the whole calculating mechanism relative to the paper upon which the record of its operations is to be made.

After a given number has been entered in the totalizing register and printed upon the record sheet, it is necessary to return all of the actuating sectors to their normal home positions, whereupon the addition or subtraction of the next succeeding number may be effected. For this purpose, I provide a so-called "printing" or "operating" lever, which is operated manually upon the completion of the set-up. This lever not only controls the printing, but it returns the actuating sectors to their normal position, and effects several specific results which can best be explained in connection with a detailed description of the mechanism.

For convenience, I provide a set of numeral wheels or index wheels, each permanently geared to one of the actuating sectors, whereby the amount of any given set-up may be read directly from this set of numeral wheels.

From this general outline, it will be understood that the operation of listing and totaling is accomplished by a set of operations as follows:

First, the actuating sectors are swung to positions corresponding with the first number of the list to be added; thereupon, the printing or operating lever is manipulated to print the first number of the list. When, through the agency of this operating lever, the actuating or set-up mechanism has been returned to its normal position, the second number of the list is entered in the totalizing register by an appropriate set-up of the actuating sectors. Thereupon, a second manipulation of the printing or operating lever will cause the second number to be printed. The totalizing register now shows the total of the first two numbers of the list. These operations are continued until the end of the list of numbers has been reached; thereupon, the reversing mechanism is brought into play to reverse the direction of the connection between the actuating sectors and the numeral wheels of the totalizing register, whereupon the actuating sectors are brought to positions corresponding with the total displayed by the numeral wheels of the totalizing register. The printing or operating lever now being actuated, will cause to be printed upon the list a number corresponding with the total of the several items which have been entered in the totalizing register.

In attempting thus to outline in a general way, the operation of the machine, I have purposely avoided a discussion of the many details which enter into and modify the general plan of operation as above stated. These had best be reserved for statement in connection with the explanation of the mechanism.

There are, further, a number of safety devices intended to prevent the possibility of false operations or indications. There are also a number of useful appurtenances to be used, as when it is desired, for example, to accumulate in the totalizer without printing on a list, or, on the contrary, to print without totalizing.

The fact that I do not attempt in this preliminary statement to enumerate or mention all of these devices, is not to be regarded as indicative of a failure on my part to appreciate their presence or their importance. I omit reference to these, simply because of the difficulty of intelligently stating or explaining them in mere general terms.

Having now stated, in a preliminary way, the general scheme of operation, I shall proceed to a detailed description of the mechanism. This may best be followed in conjunction with the accompanying drawings, in which—

Figure 1,— is a front view of the machine, including the paper roll base.

Figure 2:
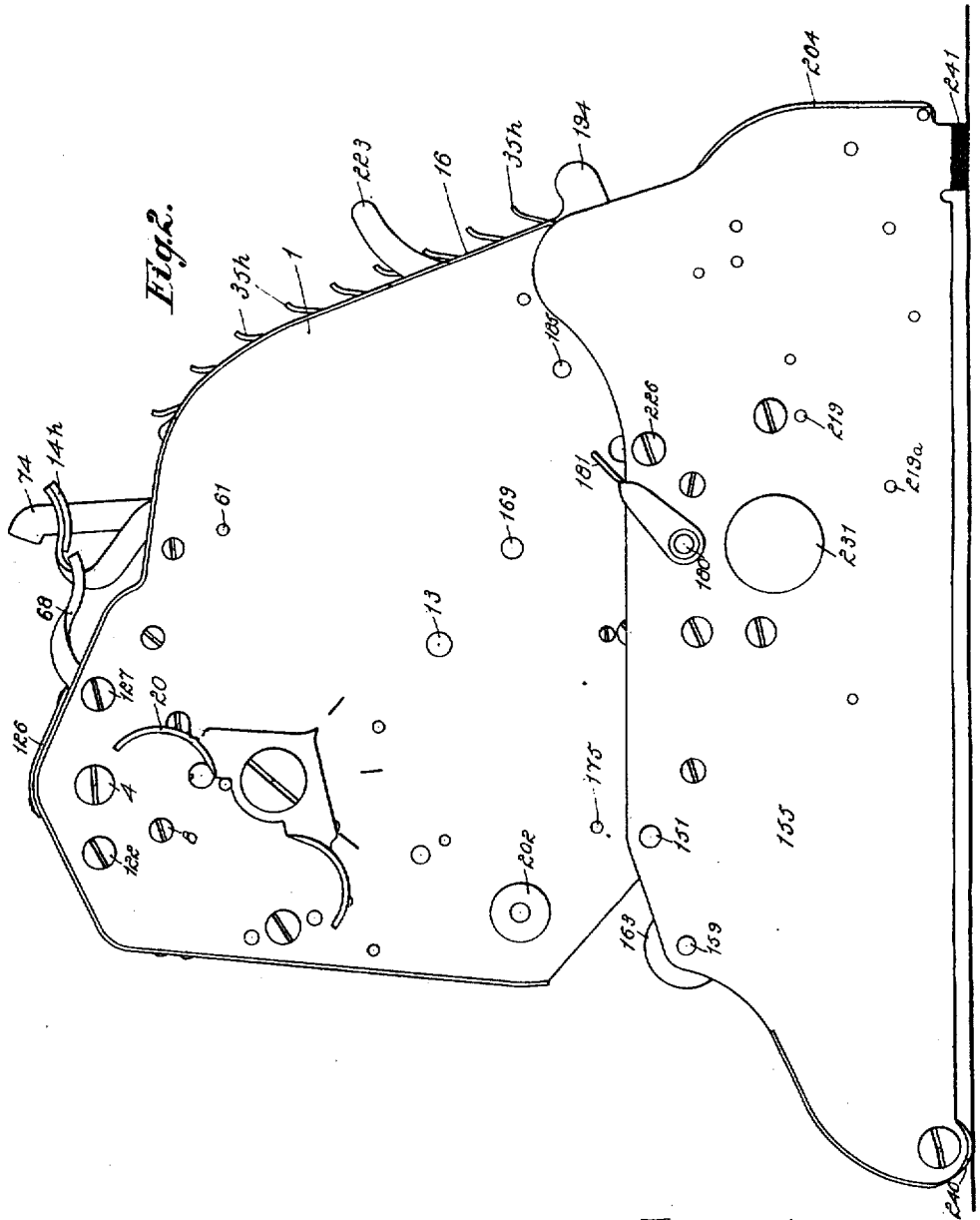

Fig. 2,— is a side view of the same.

Figure 3:
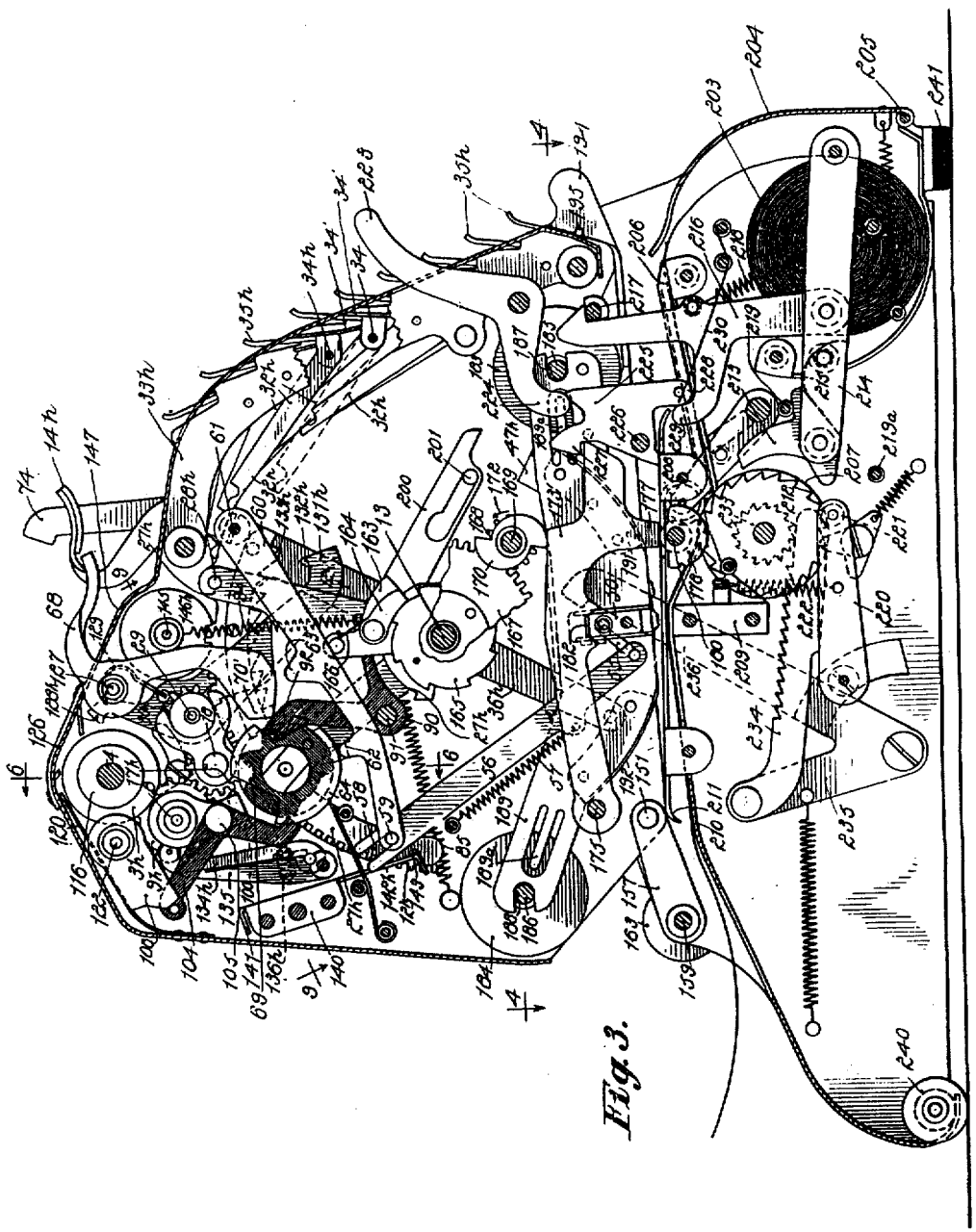

Fig. 3,— is a cross sectional view on line 3—3 of Fig. 1.

Fig. 4,— is a cross sectional view on line 4—4 of Fig. 3.

Fig. 5,— is a cross sectional detail illustrating the ribbon spool and clamp.

Fig. 6,— is an enlarged partial cross sectional view on line 6—6 of Fig. 3.

Fig. 7,— is a partial cross sectional view of the carry-over mechanism, taken on line 7 of Fig. 6.

Fig. 7ª,— is a similar view on line 7ª of Fig. 6.

Fig. 8,— is a partial cross sectional view showing the driving gears of the totalizer taken on line 8 of Fig. 6.

Fig. 9,— is an enlarged partial cross sectional view of the reversing mechanism looking in the direction of arrows 9—9, of Fig. 3.

Fig. 9ª,— is a partial cross sectional view illustrating the disposition of the totalizer and reverse wheels in a vertical plane.

Fig. 10,— is a partial cross sectional view looking in the direction of the arrows 3—3 of Fig. 1, but showing parts, only, of the various controlling mechanisms.

Fig. 11,— is a partial cross sectional view looking in the direction of the arrows 3—3 of Fig. 1, and showing the totalizer and driving gears, the printing mechanism, and the key lever return mechanism.

Fig. 12,— shows in detail the key lever return mechanism with the universal bar in its lowermost position.

Fig. 13,— is a corresponding view showing the key lever returning mechanism with the operating lever in position to carry the universal bar back to the home position.

Fig. 14,— is a side elevation with parts broken away, to show a modified form of key-board.

Fig. 15,— is a partial cross sectional view showing one bank of keys with the key tops broken away to illustrate the sidewise displacement of the keys.

Figure 16:
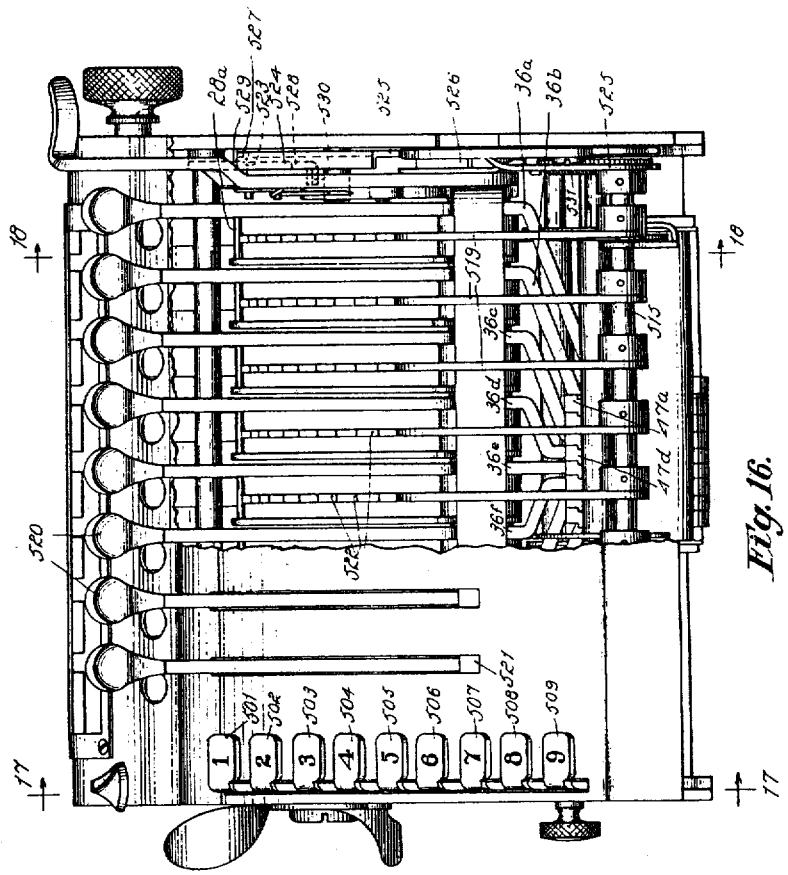

Fig. 16,— illustrates in front elevation partly broken away, a modified form of keyboard with but a single bank of key stops.

Figure 17:
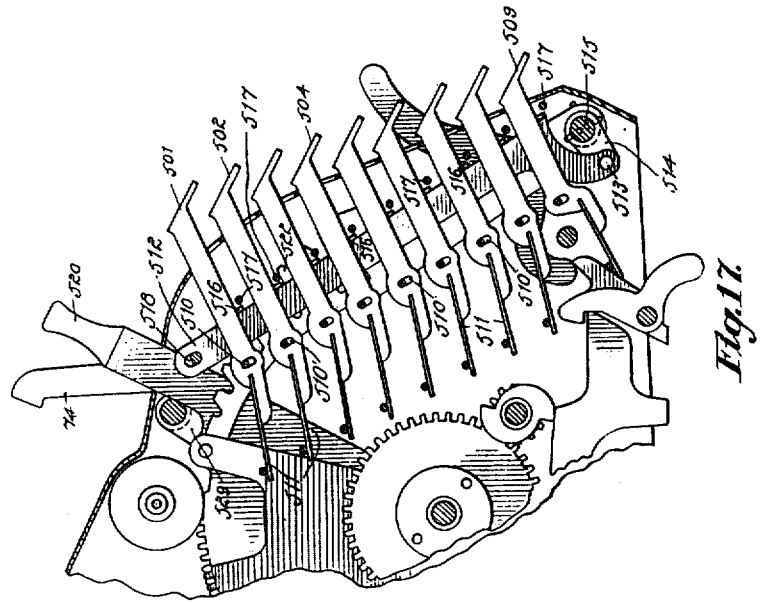

Fig. 17,— is a partial cross sectional view taken on line 17—17 of Fig. 16.

Figure 18:
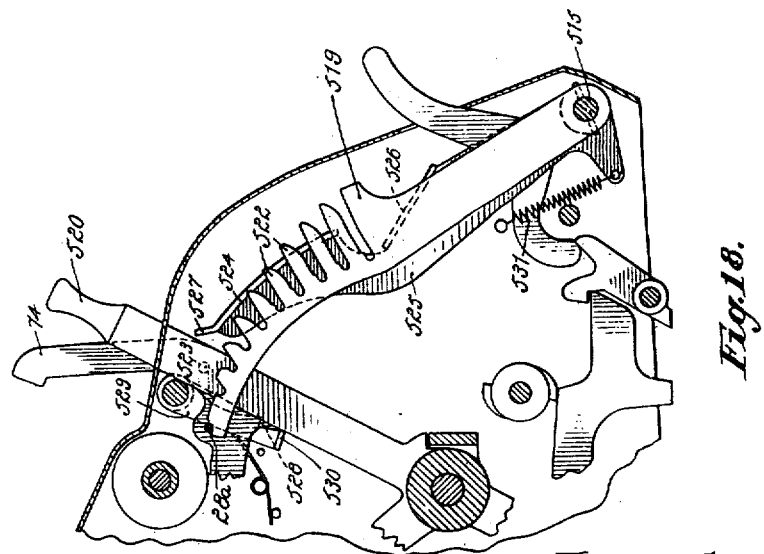

Fig. 18,— is a partial cross sectional view taken on line 18—18 of Fig. 16, showing the key lever control of a single bank key-board machine.

Fig. 19,— is a side elevation showing the combination of the calculating machine proper and a set of guide rails therefor.

Fig. 20,— is a plan view of the same.

Fig. 21,—is a partial front elevation of the machine on rails.

Fig. 22,— is a detail showing the construction of the clutch forming a part of the rail carriage.

Fig. 23,— is a plan view showing two sets of rails mounted on a plate, two carriages and one calculating machine in place.

Figure 24:
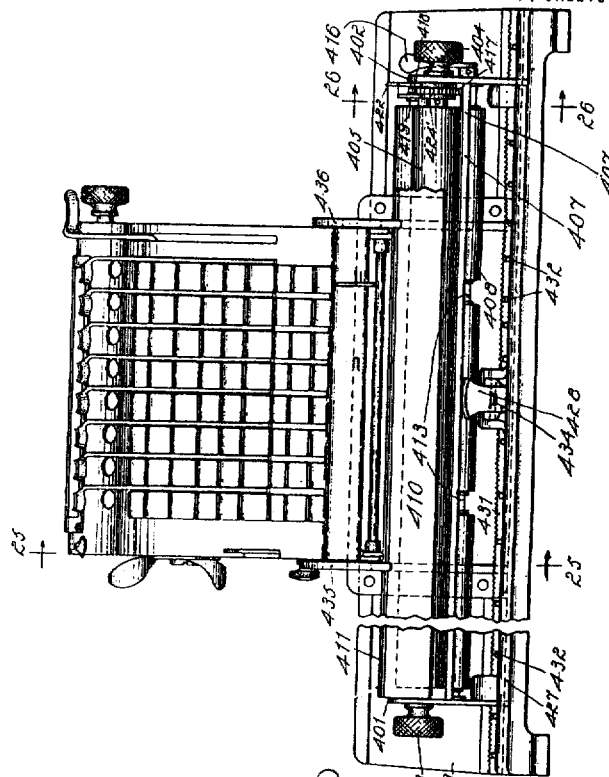

Fig. 24,— is a front elevation showing a machine with platen paper feed mechanism.

Figure 25:
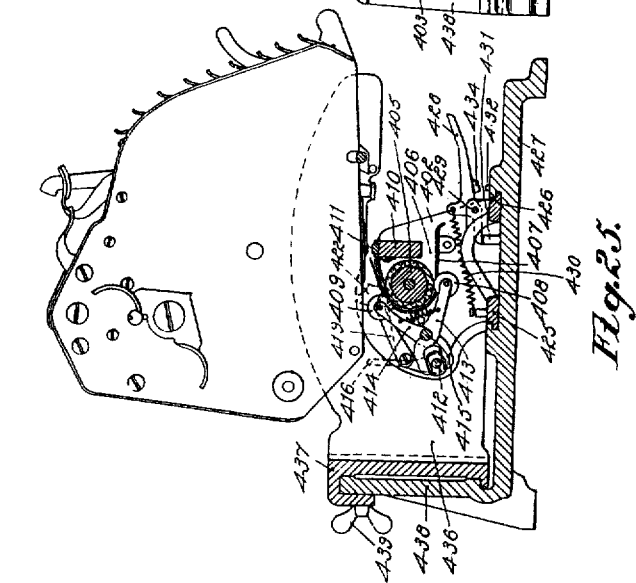

Fig. 25,— is a partial cross sectional view of the same machine, taken on line 25—25 of Fig. 24.

Figure 26:
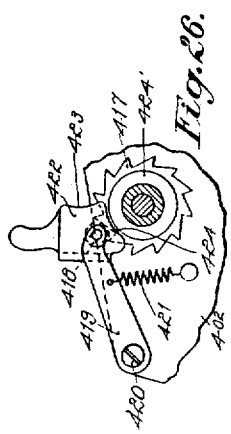

Fig. 26,— illustrates in detail, the platen ratchet.

Fig. 27,— is a partial cross sectional view corresponding with Fig. 11, but showing a modified and improved arrangement of parts which may be substituted for those shown in Fig. 11.

Fig. 28,— is a similar view of the same parts in a different position of operation.

The same characters of reference are applied to corresponding parts in all of the several figures.

I shall describe first, the totalizing register, then the mechanism for actuating the totalizer, and then the printing mechanism, and shall then proceed to describe the various forms of paper feeding mechanism with which the more strictly calculating machine part of the combination may be associated.

Practically all of the calculating machine mechanism is supported by and between the two side plates 1 and 2. As best illustrated in Figs. 3 and 6, the several numeral wheels $3a$, $3b$, $3c$ . . . and $3h$, are loosely mounted to rotate upon a numeral wheel spindle 4 carried in the side plates 1 and 2. This spindle has a longitudinal motion, which for the moment need not be taken into consideration. Associated with each numeral wheel is a register gear $5a$ . . . $5h$, and with each numeral wheel also, except that of highest order, a one tooth carrying disk $6a$ . . . $6g$. Each numeral wheel and its associated driving gear and carrying disk are fastened together by a rivet such as that illustrated in cross section at $7d$.

The carry-over and detent mechanism is loosely mounted upon a carry-over spindle 8. The carry-over and detent gearing is made up of a series of units, one of the several units having been shaded heavily in Fig. 6 to distinguish one such unit from the balance of the mechanism.

Each unit comprises a totalizer driving gear $9a$ . . . $9h$, a carry-over gear $10a$ . . . $10g$, and a detent wheel $11a$ . . . $11h$. The carry-over gear is omitted, for obvious reasons, from the first or lowermost unit of the set of carry-over gearing.

Each register gear, as for example, $5a$, remains practically permanently in mesh with its associated totalizer driving gear $9a$. All motion of any numeral wheel is, therefore, accompanied by a corresponding motion of the associated totalizer driving gear. The numeral wheels are driven forward or backward through the intervention of these totalizer driving gears.

Just how this is accomplished will be explained presently. For the moment, I wish to point out a novel feature of importance, which is confined to the totalizer, i. e., the numeral wheels and the associated carry-over mechanism.

Ordinarily, there is a 1 to 1 ratio of gearing, by means of which the carry-over between adjacent numeral wheels is effected, the mechanism being such that the ten's wheel is turned at the same rate of speed as is the unit's wheel while the carry-over is being effected. In the same way, the hundred's wheel has been turned at the same rate as the ten's wheel when the ten's is carrying into hundreds, and so on up the line. In such a construction, it will be found that when carrying takes place over several orders simultaneously, on account of lost motion the numeral wheels of the highest or higher orders will not be turned a full space, and perhaps not through a large enough part of a full space to serve the desired purpose. In order to avoid this failure to get the complete carry-over in the numeral wheels of highest order, it has been necessary, heretofore, to build the whole register mechanism with great accuracy, thereby avoiding lost motion in so far as possible. This, however, has made the register expensive, and the necessarily close fit and adjustment have made such registers stiff, thereby necessitating considerable power in order to effect their operation. The other alternative commonly used in the past, has been to employ a secondary or auxiliary mechanism of one kind or another, to effect the carry-over. My invention provides means for avoiding all of these troubles by the use of what I term "a multiple ratio carry-over gearing." The gear ratios are such that when the unit's wheel turns from the 9 to the 0 position, the ten's wheel will be turned a tenth of a revolution, but at a speed practically double that of the unit's wheel. As a matter of fact, I have found it unnecessary to use a ratio as high as 1 to 2, but the assumption of a 1 to 2 ratio will simplify the explanation. A similar multiple ratio is embodied in the mechanism for carrying from tens to hundreds, whereby the turning of the ten's wheel from the 9 to the 0 position, will cause the hundred's wheel to be turned through a tenth of a revolution, but the motion of the hundred's wheel will be at a speed practically double that of the ten's wheel, and so on up the line. If the ratio is as high as 1 to 2, and provided the lost motion is not excessive, it will be found that the numeral wheel of highest order will be turned completely through one tenth of a revolution before the unit's wheel has completed its one step advancement. This means that there is no lag in the movement of numeral wheels of higher orders. This in turn means that there may be considerable lost motion without disadvantage. This permits cheaper and less accurate workmanship, and the lost motion contributes to the ease of operation of the register. The lost motion does not, however, result in any failure to operate the register wheels of high order, because, as I have explained, the multiple ratio carry-over gearing comes into play to complete the one step advancement of a numeral wheel of one order simultaneously with, or if desired, a little before, the completion of the one step advancement of the numeral wheel of next lower order.

The multiple ratio gearing is well illustrated in Fig. 6, where it will be seen that the carry-over disk $6a$ of the unit's wheel is of large diameter, and the carry-over gear $10a$ with which it coöperates, is of small diameter, while the totalizer driving gear $9b$ is of large diameter. The tooth of the carrying disk and the notches in the periphery of the coöperating carry-over gear are of such form that the numeral wheel of one order is turned through but a tenth of a revolution whenever the numeral wheel of next lower order passes from its 9 to its 0 position. The result is that during the moment of carry-over, the numeral wheel of higher order turns at a rate higher than that of the numeral wheel of next lower order, which through its carrying disk controls the carry-over.

If there were but two or three numeral wheels to be considered, there would be no great need for this multiple ratio carry-over gearing, because the small amount of lost motion between two or three numeral wheels would be so slight as to be negligible. So also, the lost motion in the carry-over gearing of 1 to 1 ratio would prove entirely satisfactory, even with some lost motion, if the necessary carry-over could always be confined to two or three numeral wheels. If, however, the six numeral wheels of lowest order stood at 999,999, and one were then to turn the unit's wheel one step in the forward direction, the showing of the register would be changed to 1,000,000. This change in the showing of the register must be effected by means of a simultaneous carry-over from units to tens, tens to hundreds, hundreds to thousands, thousands to tens of thousands, tens of thousands to hundreds of thousands, and hundreds of thousands to millions. In other words, six numeral wheels in addition to the unit's wheel, must be given a one step advancement by means of a carry-over initiated by the unit's numeral wheel. When the carry-over must be effected in this way through a large number of orders, any considerable degree of lost motion will be very objectionable because of the inevitable failure to turn the higher order wheels through the required angle. In accordance with my invention, the full angular one step advancement of each wheel of higher order is absolutely assured, and this even if there be a considerable lost motion in each carry-over unit.

The multiple ratio carry-over gearing requires the application of more power to the driven numeral wheel from which the carry-over proceeds, than would be the case in the use of a 1 to 1 carry-over gear ratio. This requirement for additional power in driving the wheel of lower order may be minimized, however, by graduating the ratios of the units of the carry-over gear set; thus, for example, it will be seen in Fig. 6 that I have supplied the unit's numeral wheel with a carrying disk of larger diameter than that of the carrying disk associated with the numeral wheels of higher orders. The diameters of the carrying disks are shown as decreasing progressively from the unit's order toward the higher orders at the left-hand end of the drawing. The coöperating carry-over gears are correspondingly increased in diameter from right to left. Thus, the gear ratio between units and tens may be made 1 to 2, whereas the carry-over gear ratio between the two numeral wheels of the highest order may be 1 to 1. The intervening gear ratios may be graduated to suit the convenience and requirements of a particular case. It is obviously not necessary that the graduation of the gear ratios be extended to the limit. Thus, for example, the ratio between the lowermost numeral wheels of a set might be made 1 to 2, the gear ratios between the numeral wheels of intermediate orders might be made 1 to 1.5, and the ratio between the numeral wheels of the highest order might be made 1 to 1. As previously stated, I have not found it necessary nor desirable to introduce at any point, a gear ratio as high as 1 to 2, but the figures above given will illustrate the principle upon which this feature of my invention is based. The above described feature of my invention is very important in any machine which has to have a direct carry-over. I believe that this feature, in conjunction with what I term the "differential detent mechanism," subsequently to be described, goes far toward solving the problem of a direct and positively united totalizer with direct and simultaneous carry-over.

I have stated that the numeral wheels of the totalizing register are driven forwardly or backwardly, as may be required, by means of the totalizer driving gears $9a \ldots 9h$. I shall now describe the mechanism for rotating these totalizer driving gears. The rotation of each totalizer driving gear and its associated numeral wheel is controlled by a gear sector, there being a set of gear sectors $12a \ldots 12h$ corresponding in number with the numeral wheels of the totalizing register. These sectors are loosely mounted upon the gear sector axle 13. Each gear sector is stamped from a sheet of metal, of which a finger piece $14a \ldots 14h$ forms an integral part. These finger pieces or actuating levers, project through openings $15a \ldots 15h$ in the front plate 16 of the machine, and provide manually operable means for rotating the gear sectors upon their common axis of rotation.

Each gear sector is intended to effect the rotation of the associated totalizer driving gear. In order to add, it is necessary that the downward movement of each finger piece should cause rotation of the associated numeral wheel in one direction; in order to subtract, a similar downward movement of the finger piece must effect the rotation of the associated numeral wheel in a reversed direction. It is necessary, therefore, to provide reversing gearing which may be thrown in or out of mesh as may be required to effect the rotation of the numeral wheel in the desired direction. This interconnecting and reversing gearing is best illustrated in Figs. 9 and 9ª. The position of line 9—9 of Fig. 3, will show that Fig. 9 is a cross-section taken on a line below the plane of the totalizer driving gears and the numeral wheels, etc. However, I have in Fig. 9, dotted in at 9ª, the outline of the first totalizer driving gear, in order that its relation to the interconnecting and reversing gearing will be apparent. The interconnecting and reversing gearing comprises a pair of ratchet gears associated with the numeral wheel of each order, these ratchet gears being marked $16a$, $17a$, $16b$, $17b$, etc. These ratchet gears are loosely mounted upon a longitudinally shiftable spindle 18, the sidewise position of which is controlled by a reversing cam 19, rotatively mounted upon the side plate 1 and shifted angularly by the reversing button 20. The several pairs of ratchet gears are mounted between collars 21 pinned to the ratchet gear spindle 18. Short helical springs 22 are interposed between adjacent sets of ratchet gears, whereby the ratchet teeth of the ratchet gears of each pair are forced into engagement with one another. As shown in Fig. 9, the reversing button is in the non-accumulative position; i. e. an intermediate position which determines a longitudinal position of the ratchet gear spindle 18 and the ratchet gears thereon, such that both ratchet gears of each pair are in mesh with the associated totalizer driving gear. When the ratchet gears are in this intermediate position, the associated gear sector 12 may be rotated without causing any rotation of the ratchet gears or the totalizer driving gear associated therewith. If, however, the reverse button be thrown into the "adding position," the ratchet gear spindle 18 is forced to the right by virtue of the cam 19 acting upon the pin 21′, whereby the ratchet gears $16a$, $16b$, $16c \ldots 16h$ are thrust into mesh with the gear sectors $12a$, $12b$, $12b \ldots 12h$. The associated ratchet gear of each pair, viz., $17a$, $17b$, $17c \ldots 17h$, remains in engagement with the associated totalizer driving gear $9a$, $9b$, $9c \ldots 9h$. When, therefore, the gear sector $12a$ is swung in the direction of the arrow 23 of Figs. 9 and 9ª, the direct acting ratchet gear 16ª will be caused to rotate in the direction of the arrow 24. This rotation of the ratchet gear $16a$ will be communicated through the ratchet teeth to the ratchet gear $17a$ of the pair, and this latter will communicate its motion of rotation through the totalizer driving gear 9a to the register gear 5a and its associated numeral wheel 3a. As previously stated, it is necessary, however, to arrange for a rotation of the numeral wheel in the reverse direction when the gear sector is rotated in the same direction as that indicated by the arrow 23 in Figs. 9 and 9ª. In order that this result may be accomplished, I associate with each gear sector an auxiliary gear sector 27a ... 27h; the main and the auxiliary gear sectors being fastened together so far as angular rotation is concerned by means of the stop pins 28a ... 28h. Upon an idler spindle 29 are mounted a set of idler pinions 30a ... 30h. Each idler pinion is permanently in mesh with its associated auxiliary gear sector. The position and diameter of the idler pinions are such that when the ratchet gear spindle 18 is turned to the left by a suitable rotation of the reverse button 20, the ratchet gears 17a ... 17h will be forced into mesh with the idler pinions 30a ... 30h, the ratchet gears 16a ... 16h at the same time being drawn out of mesh with the main gear sectors and slipped into mesh with the totalizer driving gears 9a ... 9h. When, therefore, the reverse button is in the "subtracting" position, the downward swing of any gear sector will, through the intervention of the associated idler pinion, cause a rotation of the associated numeral wheel in a correspondingly reverse direction. It will be apparent, without further explanation, that the ratchet teeth of the ratchet gears will act in a direction such as to transmit motion to the numeral wheels in this reverse direction.

It may be well at this point to call attention to the action of the ratchet gears in permitting the necessary carry-over to be effected. Assume, for example, that the finger piece 14a is being depressed in order to drive directly the unit's wheel of the register, and assume also, that the unit's numeral wheel is thus driven from its 9 to its zero position. The carry-over gearing previously described, will transmit motion corresponding with one-tenth of a revolution directly from the unit's numeral wheel to the ten's numeral wheel. This indirect, or carry-over driving of the ten's numeral wheel, will cause a corresponding angular rotation of the totalizer driving gear of the ten's order; the totalizer driving gear of the ten's order will at this time be in mesh with the ratchet gear 17b, which will thus be caused to rotate through a small angle in the direction of the arrow 31b of Fig. 9. The associated ratchet gear 16b of the pair is at this time in mesh with the main gear sector 12b, but the direction of the ratchet teeth of the ratchet gears is such that the associated engaging spring 22 will permit the ratchet gear 16b to slip to the right, thereby permitting the necessary rotation of the ten's order wheel and the gearing in mesh therewith. It is to be noted in this connection also, that the alinement of the ratchet gears is such that the ratchet teeth come normally to positions such that the faces of the teeth do not quite engage one another. This insures the dropping of the ratchet teeth into positions such that they will be in condition to transmit power from the gear sectors to the numeral wheels whenever called upon to do so. If it were not for this slight degree of lost motion between the faces of the ratchet teeth of the ratchet gears, there would be danger of a failure through lost motion in the carry-over mechanism, to move the ratchet gears through a sufficient angle to insure their proper operation when called upon to transmit power to the numeral wheels.

The arrangement thus far described, permits the numeral wheels of the totalizer to be operated positively and directly upon or during the forward actuation of the controlling and driving mechanism as governed by the setting levers 14. The arrangement is such also as to permit the necessary carry-over to be effected simultaneously with the actuation of the numeral wheels. Furthermore, the mechanism is reversible both for driving and for the purposes of carry-over. This construction has several advantages. It results in a positive carry-over, as well as a positive actuation of the numeral wheels of the totalizer. It eliminates all set-up mechanism for the carry-over, as well as for the actuation of the totalizer. The arrangement enables me at once to dispense with a lot of complicated mechanism, much of which is necessarily dependent upon the operation of springs which are likely to get out of order. The arrangement enables me to dispense also with complicated mechanism for driving the set-up keys or levers from a common actuating source. The ratchet mechanism replaces the positive mechanisms of the prior art for pulling the actuating means out of engagement with the totalizer mechanism. I am enabled, therefore, to dispense with the engaging and disengaging mechanism heretofore employed. The ratchet mechanism also permits the necessary carry-over to be effected without the necessity of pulling the actuating mechanism out of engagement with the totalizer mechanism. The ratchet mechanism is peculiarly valuable in a machine intended to both add and subtract, as with a minimum of parts I am enabled to drive the totalizer mechanism in either direction, and with the assurance that the proper carry-overs will be effected.

Thus far, I have described the mechanism of the totalizer, and in part the totalizer mechanism. In so doing, I have assumed that the several gear sectors may be swung from their normal or home position, through angles of rotation appropriate to the required rotation of the numeral wheels of the totalizer. Although it might be possible to swing the gear sectors through the appropriate angles, neither more nor less, and to stop them at the requisite points in their swings, I have provided a manually governed mechanism for determining and limiting the swing of the gear sectors to correspond with the digits of the numbers to be set up and driven into the totalizer. This mechanism comprises:—for each actuating lever or key, a set of nine pivoted key stops as shown at 32$h$ in Fig. 3. Each pair of key stops is pivoted between a pair of key bars as shown at 33$h$ in Figs. 3 and 15. The pivots are shown at 34$h$, and the thumb pieces at 35$h$. The key stop lever 32$h$, is desirably formed integrally with its associated thumb piece 35$h$, the pair constituting a sort of bell crank lever pivoted at 34$h$. When, therefore, the operator presses his thumb against the face of a thumb piece 35$h$, he depresses the associated key stop against the pressure of the spring 34', as indicated in dotted lines in Fig. 3 as to the fourth key stop of the bank of highest order. When thus depressed, the receiving notch at the inner end of any key stop assumes a position such that the pin 28$a$ ... 28$h$ of the associated gear sector when swung forward will strike the notch at the end of the depressed key stop. The lengths of the key stops are such as to limit the swing of the associated gear sector to an amount which will drive the associated totalizer numeral wheel through an angle corresponding with the digit assigned to the depressed key stop. In using the machine, the operator presses his thumb against the appropriate key stop button or thumb piece, at the same time hooking the index finger of the same hand over the actuating lever of the gear sector of the same order and pulling the gear sector forward until it is stopped by engagement of the stop pin with the key stop.

By the use of this arrangement, the gear sectors are brought rapidly, yet accurately to the positions required in setting up any number. It is to be noted that the gear sector has but one point of engagement, viz., the pin 28, which coöperates with all nine of the key stops. It is necessary, of course, that the lengths and positions of the key stops be gaged accurately. It is also necessary that the position of the gear sector stop pin 28 be accurately determined, but the cost of construction is materially less with my invention than would be the case if nine stopping points of one kind or another were associated with each gear sector. If each gear sector had nine stopping points or ledges and each one of them would have to be accurately located, this would require a considerable amount of high class workmanship which my construction avoids.

It is to be noted also, that the key stops are of different lengths, the uppermost key stop being the shortest and the lowermost being the longest. The purpose of this arrangement is to spread out the thumb pieces 35, while limiting the movement of the gear sector to a comparatively small angle of rotation. If it were not for this arrangement, the angular swing of the gear sector would be undesirably large, or, as a possible alternative, the thumb pieces would be too close together for ease in selection and manipulation.

I may conveniently at this point, call attention to a useful modification illustrated in Fig. 14, where I have shown two gear sector stopping pins 28$h^1$ and 28$h^2$. The uppermost key stops coöperate with the stop pin 28$h^1$, whereas the lowermost key stops, representing the higher digits of the bank, coöperate with the second key stop 28$h^2$. This arrangement permits the use of shorter key stop levers for the higher digits of the bank; it also reduces the number of duplicating stampings required for the key stops, because the lower group of key stops may be duplicates of the stampings for the upper group of key stops. This arrangement, shown in Fig. 14, has in a large degree the same advantages as have been pointed out in connection with the arrangement shown in Fig. 3.

Thus far, I have described the totalizing register and the mechanism for actuating it. I have not yet described the mechanism for returning the totalizer actuating mechanism to its normal, or home position after a given number has been entered in the totalizer register, but I shall defer my description of this mechanism until after I have explained the mechanism for printing a record corresponding with the actuation of the totalizing register.

For the purpose of effecting this printing, each gear sector stamping is provided with a downward extending lever arm 36$a$ ... 36$h$, Fig. 3 and Fig. 11. To the lower end of each such extension a type segment 47$a$ ... 47$h$ is pivoted at 48$a$ ... 48$h$. A short compression spring 49 tends to tilt the forward end of the type segment up into engagement with the type segment guide bar 50, which extends across the machine from side-plate to side-plate. When the actuating gear sectors are swung forward to drive the corresponding numeral wheels of the totalizer, the type segments will be swung backwardly a corresponding amount. On the lower side of each type segment is a series of types 51—51, from 0 to 9, angularly displaced in a manner such that for any set-up of the totalizing register, the corresponding type figure is brought to the printing line; which printing line, by the way, is directly below the type segment guide bar 50. I shall not stop at this point to describe how the paper is fed to the printing line, but for the present it will suffice to know that after the register has been set up by an appropriate movement of the gear sectors, the whole of the mechanism thus far described is given a slight downward movement to cause the types to imprint the desired impressions upon the paper strip.

Although Fig. 16 is intended primarily to show better than any other, perhaps, the fact that the type segments are not spread out across the width of the machine, as are the gear sectors, etc., this Fig. 16 shows how the extension levers 36a ... 36h are bent in toward the center to concentrate the printing segments within an appropriately narrow width. This Fig. 16 also shows that the type segments are narrow strips of metal lying adjacent to one another. Each type segment has a projection on the upper right side, and another projection on the lower left side, the projection on the right-hand side of one type segment lapping over the projection on the lower left-hand side of the next type segment to the right. The line 52h of Fig. 11, indicates the upper boundary of the ledge or projection, extending from the lower left-hand side of a type segment. The purpose of this arrangement is as follows: If the figure 500 is set up in the totalizer register, we wish to print the figure 500 on the paper strip. This means that we have to print two zeros to the right of the numeral 5, while the space to the left of the numeral 5 is to remain blank. Assuming, therefore, that the operator has pulled the gear sector of the hundred's order to its angular position corresponding with the digit 5, it will be seen that the type segment of the third order will be pulled back through an angle such as to bring the type "5" to the printing position directly below the guide bar 50. Each type bar has a notch 53 in its upper surface, this notch resting normally against the lower side of the guide bar 50. When the type bar is swung into a position to print a significant figure, as shown, for example, in Fig. 28, the guide bar 50 will ride up out of the notch 53, thereby forcing the type segments downwardly through a small angle about the pivot 48 and against the compression of the spring 49. This slight downward movement of the type segment of the hundred's order will cause the type segments of the ten's and unit's orders to be moved downwardly through a similar small angle. This is due to the over-lapping of the projections heretofore explained. The projection at the lower left-hand side of the type segment of ten's order will be engaged by the over-lapping projection of the upper right-hand side of the type segment of hundred's order, whereby the downward movement of the type segment of the hundred's order will cause a corresponding downward movement of the type segment of the ten's order. In like manner, the downward movement of the type segment of the ten's order will cause a corresponding downward movement of the type segment of the unit's order. The over-lapping of the projections or ledges of the type segments is in such a direction, however, that the downward movement of the type segment of hundred's order will not cause any downward movement of any type segment of higher order. Since all of the type segments stand normally in the position to print zeros, the result of the over-lapping projections is to cause all of the type segments to the right of a significant figure to be forced downwardly, so that they will print zeros. All type segments to the left of highest significant figure will, however, be left in their normal position where they will not print upon the subsequent downward movement of the type segment guide bar 50 and the balance of the calculating mechanism.

It will now be apparent that the arrangement of the printing mechanism is such that type will be brought to the printing position and condition corresponding with any set-up which the gear sectors may be made to drive into the totalizing register. In view of the automatic printing of the necessary zeros to the right of significant figures, it is unnecessary for the operator to pay any attention to zeros in the operation of the machine. It is necessary merely to actuate the gear sectors corresponding with significant figures, and the mechanism of the machine of my invention will automatically take care of the printing of the necessary zeros.

Having in this way described the printing mechanism, I can better explain a certain feature of the ratchet gear mechanism associated with the totalizer. It will be noted in Fig. 11, for example, that the space between the 0 type and the 1 type of the printing segment is slightly greater than the spaces between types 1 and 2, 2 and 3, 3 and 4, etc. This will necessitate a longer stroke of the finger piece; in other words, a slightly greater angular movement of the gear sector, when actuating the same from 0 to 1, than when actuating the same between the remaining digits of the bank. It will be remembered that the faces of the teeth of the ratchet gears did not normally come quite into engagement with one another (Fig. 9). For this reason, a small additional movement of the gear sector between 0 and 1 is required to rotate the ratchet gear into a position to take up the slack. This additional movement between 0 and 1 would not be necessary if the faces of the teeth of the ratchet gears came exactly into engagement when in the home position. If, however, the teeth of the ratchet gears were designed to come exactly into engagement, with no slack or lost motion, it is quite likely that they would fail at times to move far enough to snap into the engaging position. This might result from wear, or from lost motion, but if as the result of preceding operations, the teeth did not find themselves in engagement, a subsequent operation would cause the ratchet mechanism to slip through an angle corresponding with one step before picking up and turning the numeral wheel. This, of course, would give rise to errors in the operation of the machine. The small degree of extra motion which I introduce between the 0 and the 1 position of each gear sector, enables me to return the ratchet gear mechanism always to a position which will insure the proper engagement of the ratchet teeth throughout the first one step movement of the associated gear sector. The missing of one unit in the operation of the numeral wheels of the totalizing register is thus made practically impossible.

I have heretofore explained that my machine is adapted for direct subtraction, as well as for direct addition. In conformity with my plan of operating the totalizing register, I have provided means for printing automatically, the nature of the actuation of the register. I shall now describe this feature.

Pivotally mounted in the type segment guide bar 50, just to the right of the right-hand printing segment 47a is an auxiliary character printing segment 54, as illustrated in Figs. 4, 10 and 11. Just below Fig. 10, I have shown four characters which the type of the character printing segment are arranged to print. The plus sign is swung into the printing position when the totalizer is actuated, as in addition. The star is brought to the printing position when a non-cumulative number is printed. The minus sign is brought to the printing position when subtraction is effected, and the letter T is brought to the printing position when the total is taken and printed. These characters may be varied to represent debit and credit, for example, or any other form. Ordinarily, the type corresponding with the addition position would be dispensed with and I have, therefore, shown no type corresponding with the plus character, as represented below Fig. 10.

As explained in connection with the reversing mechanism between the actuating mechanism and the totalizer mechanism, the direction of the actuation of the numeral wheels of the totalizer is controlled by the reverse button 20. The position of this reverse button is, therefore, made to control the position of the auxiliary character printing segment, and thus to control the selection of the character printed alongside the numbers which are listed and totaled. This connecting mechanism comprises:

A lever arm 55 rigidly connected with the character printing segment 54; a push rod 56 equipped with a retarding spring 57 and having a slot 58 at its upper end, adapted to engage with a pin 59 at the end of the character controlling cam 60. This cam is pivoted at 61 to the side-plate 1, and is provided with a main cam surface 62 and an auxiliary cam surface 63. The main cam surface 62 coöperates with a cam disk 64, which is best shown in Fig. 9 as attached to the reversing button 20 and the reversing cam 19 just inside the left-hand side-plate 1. The arrangement is such that the character printing cam disk 64 assumes various angular positions corresponding with the angular positions of the reversing mechanism. As shown in Figs. 9 and 10, the reversing mechanism is in the non-cumulative position; in other words, the position in which the totalizer is disengaged from the actuating and printing mechanism. When the reversing mechanism is in its non-cumulative position, the projection 62 of the cam lever 60 rests in the shallow notch 65 in the periphery of the cam 64. The retarding spring 57 acts to force the projection of the cam lever 60 into engagement with the periphery of the cam 64. The notch limits this tendency to an extent such that the character printing segment 54 assumes the position shown in Fig. 10, viz., the position in which the star will be printed to indicate the printing of a number not accumulated in the totalizer. When the reversing button 20 is thrown into the adding position, the cam 64 is turned slightly in a counter clockwise direction (looking at Fig. 10), whereby the projection 62 of the cam lever 60 is made to ride up upon the periphery of the cam 64. This causes a depression of the cam lever 60 and the connecting link 56, whereby the character printing segment is shifted into the adding position, in which ordinarily no character will be printed. As previously explained, however, a type bearing a plus sign may be employed to print the plus character opposite each number which is added in the totalizer. In order to effect a subtraction, the reverse button is turned in the opposite direction, thereby bringing the deeper notch 66 of the character cam 64 opposite the projection 62 of the cam lever 60. The spring 57 cannot, however, force the projection 62 fully to the bottom of the notch 66, because the auxiliary projection 63 of the cam lever will engage the cam surface 67 of the total key 68. The spring 57 will, however, move the cam lever 60 and, consequently, the character printing segment 54, a sufficient distance to bring the minus type into the printing line, thereby causing a minus sign to be printed opposite the numbers which are driven into the totalizer in the direction corresponding with subtraction.

The character printing segment has also a fourth position to indicate the printing of a total. When the total is to be printed, the totaling key 68 is depressed, thereby turning it slightly in a clockwise direction. In order to print the total, however, it is necessary that the reverse button be first thrown into the subtracting position. This brings the notch 69 of the character cam 64 into a position such that the foot 70 of the total lever cam may be swung to the left. When, therefore, the reverse button has been turned to the subtracting position and the total key has been depressed, the cam surface 67 of the total lever cam be swung out of the way of the projection 63 of the cam lever 60, thereby permitting the projection 62 of the cam lever to drop fully to the bottom of notch 66 in the periphery of the character cam 64. The spring 57 acting upon the link 56, thereupon turns the character printing segment 54 to the final position in which the type capital key is brought to the printing line.

I have not in this connection, fully explained the main function of the total key 68, but in so far as the operation of the character printing segment is concerned, it may be taken for granted that the total is to be taken whenever the total key is depressed in the manner just described.

The printing mechanism of my machine is, therefore, such that the numbers driven into the totalizer either in a direction to add, or in a direction to subtract, are automatically printed together with a character or symbol in each instance indicating the direction in which the number influences the total. I am enabled, also, to print numbers which are not driven into the totalizer, and the fact that such numbers are non-cumulative is indicated by the automatic printing of a proper sign. The mechanism serves also to print the total, together with a symbol indicating that the number thus printed is the total. This latter feature will not, however, be fully understood until I explain the operation of the totaling mechanism, which I shall now proceed to do.

The operation of the totaling mechanism will be best understood in conjunction with the mechanism controlled by the operating lever which governs the printing of the set-up and also the return of the actuating mechanism to its home position upon the completion of the printing of each set-up.

A long universal bar 70 extends across the width of the machine. The stamping of which this universal bar is formed, is at either end, bent at right angles to form the crank arms 71 and 72, which are pivoted to permit the rotation of the universal bar about the shaft or spindle 13. The crank arms 71 and 72 are extended to form cams for purposes subsequently to be described. For the present, I call attention to the fact that each gear sector, pivoted to rotate about the shaft 13, is provided with a lug or projection 73 adapted to engage the universal bar 70. Figs. 3, 10 and 11 show these various parts in their normal or home positions.

When any gear sector is advanced by its finger piece, as in the act of driving a number into the totalizer, the lug or projection 73 of that gear sector will engage the universal bar 70, thereby swinging it in a clockwise direction about the spindle 13; the extent to which the universal bar is swung being dependent upon the extent to which the gear sector is rotated. Ordinarily, the set-up of a number will involve the rotation of more than one gear sector. The universal bar will be rotated to an extent determined by the gear sector which sets up the largest digit.

When the set-up has been completed by a proper actuation of the several gear sectors, the operating lever 74 at the right-hand side of the machine is rotated forwardly and downwardly in a clockwise direction, as viewed in Figs. 3 and 11. Fig. 1 best illustrates the fact that this operating lever is located just inside the right hand side-plate 2. It is rigidly mounted upon the gear sector spindle 13, and is provided with a bell crank pawl 75, pivoted to the operating lever at 76 and provided with a tail 77 engaged by the tail spring 78, the fixed end of which is geared between the pins 79 and 80 projecting from the side of the operating lever 74. This bell crank pawl rests normally against the beveled projection 81 of the cam 82, stamped integrally with the crank arm 72 at the right hand end of the universal bar. The pressure of the pawl 75 upon this beveled projection 81, tends normally to hold the universal bar in the home position shown in Figs. 10 and 11. When, however, the universal bar is swung in a clockwise direction, due to a rotation of any of the gear sectors, the pawl 75 rides up over the beveled projection 81 and on to the periphery 83 of the returning cam of the universal bar, as illustrated in Fig. 12. As previously stated, the operating lever 74 is swung to the full end of its stroke in a clockwise direction, upon the completion of each set-up. The extent of the forward movement of the operating lever is such that the pawl 75 will be moved around to a position such as that illustrated in Fig. 13, the universal bar being there shown in its position farthest removed from the home position, as, for example, when one of the gear sectors has been swung to its 9 position. When, as shown in Fig. 13, the operating lever reaches the end of its forward stroke, the pawl 75 drops onto the lower periphery 84 of the cam 82; thereupon the operator releases the operating lever, which is immediately returned to its normal home position by the retracting spring 85 which acts through the pin 86 upon the operating lever. During this return movement of the operating lever, the pawl 75 engages the projection 87 of the cam 82, thereby swinging the universal bar from the position shown in Figs. 12 and 13, back into the normal home position as shown in Figs. 10 and 11. The universal bar carries with it, any and all of the gear sectors which may have been swung out of their zero positions in effecting the last set-up. A stop pin 88 is mounted on the side-plate 2 in a position such that the tail 77 of the bell crank pawl 75 will engage the stop pin just before the operating lever returns fully to its home position as determined by the same stop pin 88. The result of the engagement of the stop pin with the tail of the pawl 75, is to raise the pawl above the projection 87 of the cam 82, thereby bringing it to rest upon the beveled surface 81 of the cam. The nature of the engagement of this beveled surface by the cam 75, is such that the cam is slightly pressed to remain in its home position, while at the same time the forward swing of any gear sector will bring to bear upon the universal bar a pressure sufficient to overcome the force exerted upon the beveled surface 81, whereby the universal bar, although lightly retained in its home position, may be swung out of its home position when necessary. The necessity for the cam projection 87, whereby the universal bar is firmly engaged and returned to the home position through the action of the operating lever, is obvious. The necessity for the peculiar coöperation between the beveled surface 81 and the pawl 75, may not be so apparent. This will be understood, however, by reference to the mechanism at the left-hand end of the universal bar. The crank arm 71 is formed into a cam 89 adapted to coöperate with a cam lever 90 which is pivoted at 91 to the left-hand side plate 1. The upwardly extending arm or projection 92 of this cam lever 90 rides upon the surface of the locking and alining cam 93. In Fig. 10 I have endeavored to indicate the outline of this cam by shading it, although as a matter of fact it lies mostly behind the character cam 64. In like manner I have shaded the bell crank cam lever 90 and the cam 89 of the universal bar, so that the whole of this coöperating cam system may by its color tone be distinguished from the balance of the mechanism shown in the drawings. It will be seen that a spring 94 acting upon the horizontally projecting arm 95 of the cam lever, holds the projection 92 in engagement with the surface of the locking cam 93. If the universal bar is in its home position as illustrated in Fig. 10, the projection 95 may be moved down over the corner 96 of the cam 89. When, therefore, the universal bar and, necessarily also, all of the gear sectors, are in their home positions, the locking cam 93, which virtually forms a part of the reverse button 20, may be swung from any one of its three positions into either of the other two positions. As illustrated in the drawing, this locking cam has three notches, into any one of which the projection 92 will drop to disengage the hooked projection 95 of the cam lever 90 from the corner 96 of the cam 89. If, however, the universal bar is in any position other than the home position, an attempt to turn the reverse button from one position to another will be resisted and prevented, because the periphery of the cam 89 will stand in the way of the downward movement of the projection 95 of the cam lever 90, thereby making it impossible for the projection 92 to be swung out of the notch of the locking cam 93, in which it may at the time be lodged. This mechanism acts automatically, therefore, to safeguard the machine against false operations. An attempt to cause a false operation might be made by the operator, if, for example, he had been listing a number of debits to be added, and came then to a credit item which should be subtracted. He might very possibly forget to throw the reverse button into the subtracting position before starting the set-up of the number which should be subtracted. He might, for example, actuate the gear sectors of the thousands and hundreds order, while leaving the reverse button in the adding position. Then, realizing his mistake, he might attempt at once to shift the reverse button into the subtracting position, and then proceed with the actuation of the gear sectors of ten's and unit's orders. If the mechanism permitted him to reverse the direction of operation in the midst of an attempted set-up, the result would be an erroneous and meaningless actuation of the totalizer,—the thousands' and hundreds' numeral wheels having been driven in the forward direction, and the ten's and unit's wheels having been driven in the reverse direction. The safety locking mechanism just described, comes automatically into play to prevent such false and meaningless operation of the mechanism. As soon as any gear sector has been moved out of its home position, the universal bar is swung through a greater or less angle, but always an angle sufficient to bring the upstanding periphery of the cam 89 underneath the projection 95 of the cam lever 90. It is impossible, therefore, after the first gear sector has been shifted from the home position, to turn the reverse button to change the direction in which the actuating mechanism may drive the numeral wheels of the totalizer. If, therefore, after beginning a particular set-up, the operator discovers that he has failed to put the reverse button in the proper position, it will be necessary for him first to depress the operating lever 74 to cause the return of the universal bar and all of the gear sectors to their home positions, and then to eradicate the error by canceling from the totalizer an amount corresponding with the false operation. After canceling the amount of the false operation by a suitable actuation in the reverse direction, he may proceed with the calculation as though no error had been made.

The above explanation of the locking mechanism will make more clear the whole purpose and function of the yielding engagement between the pawl 75 and the beveled corner 81 of the cam 83 at the right-hand end of the universal bar. This mechanism serves normally to hold the universal bar fully and surely in its home position, thereby permitting the turning of the reverse button as may be required in conformity with the calculations to be made. The beveled corner 81 of the cam 83 eases off the pressure of the operating lever upon the universal bar just before the home position is reached on the return stroke. This prevents or minimizes the rebound of the universal bar which might otherwise occur if it were snapped too sharply into the home position. Any such rebound might bring the corner 96 of the cam 89 to a resting position beneath the projection 95 of the cam lever 90, thereby locking up the reverse mechanism to prevent its shifting when required.

Without proceeding immediately to describe the mechanism whereby the actuation of the printing lever effects the printing of the set-up, I think it may be well to explain a useful feature of my invention, which, like the locking mechanism just described, also safeguards against false or erroneous operations.

In the ordinary use of adding and subtracting machines, there is far more straight addition than there is promiscuous addition and subtraction. Even when subtractions are involved in a given calculation, they are likely to be far more rare than are the operations of addition. I have, therefore, provided mechanism such that the machine may be more or less permanently set for addition, while for the subtracting operation a special act of the operator will in each instance be required. If it were not for this provision, an operator would be quite likely to forget to return the reverse button to its adding position, after having thrown it into the subtracting position to take care of one or two subtractions occurring in a long list of figures, most of which involve addition. This mechanism comprises a projection 97 on the periphery of the locking cam 93. This projection is engaged by the free end of a spring 98, the pressure of the spring being taken off by the stop pin 99 as shown in Fig. 10. The mechanism is in this figure shown in the neutral or non-cumulative position. In other words, the machine is in a condition such that the gear sectors and the operating lever may be actuated to list numbers, which numbers will not, however, be driven into the totalizer. The reverse button and locking cam 98 may be turned in a counter clockwise direction, as shown in Fig. 10, without affecting the spring 98. Such counter clockwise rotation of the reverse button will put the totalizer mechanism in mesh with the gear sector mechanism in a relation required for addition. When, therefore, the reverse button is thrown into the adding position, it will retain this position until the operator manually turns the reverse button into some other position. When a subtraction is to be performed, it is necessary for the operator to turn the reverse button and the locking cam 93 in a clockwise direction (Fig. 10). This slight necessary rotation of the locking cam must be effected against the pressure of the returning spring 98, which will be lifted from the stop pin 99 at the projection 97 on the periphery of the locking cam. It is, therefore, necessary for the operator to turn the reverse button and hold it in the subtracting position until he has started the forward movement of some one of the gear sectors. As soon as any gear sector has been moved from its home position, as in the act of establishing the necessary set-up of subtraction, the locking mechanism will come into play to retain the intermediate gearing in the reverse or subtracting position until the set-up of subtraction has been driven into the totalizer and printed. Such temporary locking of the intermediate gearing in the subtracting condition, results from the fact that the first part of the movement of any gear sector will swing the universal bar in its cam 89, into a position such that the projection 95 cannot be depressed. The spring 98 will, therefore, find it impossible to return the locking cam 93 to the neutral position, because the turning of the locking cam can be accomplished only as the projection 92 of the cam lever 90 may be forced to the right. This being prevented by the abnormal position of the cam 89, the reverse button and its associated mechanism are forced to remain in the subtracting position until after the set-up has been completed, and until after the operating lever has been actuated to restore the universal bar and all of the gear sectors to their home positions. As soon as the universal bar reaches its home position on the return stroke, the spring 98 acting upon the projection 97 of the locking cam 93, will overcome the tension of the spring 94 of the cam lever 90 to raise the projection 92 of the cam lever out of the notch of the locking cam 93 assigned to the subtracting position and upon the return of the locking cam to its neutral position to permit the projection 92 to drop into the notch of the locking cam 93, which corresponds with the neutral position. The spring 94, acting through the projection 92 upon the notches in the periphery of the locking cam 93, acts as a detent to prevent over-throw of the reverse mechanism when returned to its neutral position by the spring 98. In fact, this mechanism acts as a detent to bring and retain the reverse mechanism accurately and necessarily in some one of its three positions as predetermined. If for any reason the reverse button is not accurately in some one of its three positions, the projection 92 of the cam lever 90 will be found a slight distance to the right of the normal position shown in Fig. 10. This means that the hooked end of the projection 95 will come down around the corner 96 of the cam 89, thereby preventing the swing of the universal bar or any gear sector until the inaccuracy in the position of the reverse mechanism has been corrected.

I wish now to describe the alining mechanism which insures an alinement of the intermediate and reversing gearing, such that the mechanism will come always into proper mesh. Before doing so, however, it may be well to refer back for a moment to the operation of the ratchet gears which has taken place in conjunction with the actuation of the operating lever. It will be remembered that the gear sectors drive the numeral wheels through the intervention of the pairs of ratchet gears. The ratchet teeth of the ratchet gears face in a direction such that the forward swing of a gear sector causes the simultaneous rotation of the associated numeral wheel, and this regardless of whether the numeral wheel be driven in the forward or in the reverse direction. When, however, the operating bar returns the actuated gear sectors from the positions into which they have been advanced in effecting the set-up, the gear sector will cause a backwardly rotation of the ratchet gear with which it has been directly or intermediately in mesh. The teeth of the ratchet gears, however, face in such a direction that the ratchet gear in mesh with the gear sector or idler, may be thus rotated in the reverse direction without causing a corresponding reverse movement of the other ratchet gear of the pair, viz., the one which at the time is in mesh with the totalizer driving gear, which remains permanently in mesh with the register gear of the numeral wheel. The springs 22 between the pairs of ratchet gears, permit the ratchet gears to slip or click back over one end during the return of the actuating mechanism to its home position, without causing a corresponding movement of the associated numeral wheels. Certain detent mechanism, subsequently to be described, is associated with the numeral wheels, or rather, more directly with the totalizer driving gears, to prevent any movement of the numeral wheels due to the slight pressure between the teeth of the ratchet gears as effected by the ratchet gear springs 22.

The ratchet gearing is arranged to permit this idle restoration of the actuating mechanism, regardless of the position of the intermediate and reversing gearing; that is to say, the ratchets are reversible so that they may act to drive in either direction, and regardless of the direction in which they drive, the driven ratchet gear remains fixed in position while the driving ratchet gear slips back to a home position as determined by the return of the associated actuating gear sector. As previously explained, the reverse button is actuated to throw the pairs of ratchet gears to one side or the other, as may be necessary to establish a direct or a reverse connection between the gear sectors and their associated numeral wheels. The accomplishment of this reversal of the interconnection, requires the sidewise shifting of gearing whose teeth must come accurately into mesh with the teeth of other gears. To insure the proper intermeshing of this gearing, it is necessary, or at least desirable, to provide alining mechanism which will act to aline the gear teeth wherever and whenever they are not positively maintained in proper alinement or mesh by other conditions. I have, therefore, provided a universal alining bar 100, pivotally mounted at 101 and 102 at either end to swing about the spindle 8 and to mesh with the gear teeth of the ratchet gears 16a—17a, 16b—17b, . . . 16h—17h, as best illustrated in Figs. 6 and 10. Mechanism must be provided, whereby the alining-bar spring 103 will force the alining-bar between the teeth of the ratchet gears whenever the ratchet gears are drawn out of mesh with the main gear sectors and idlers; in other words, whenever the ratchet gears assume the intermediate position shown in Fig. 9. Fig. 10 is a side elevation of the mechanism when in the neutral position illustrated in Fig. 6. Fig. 10, therefore, shows the alining-bar in mesh with the teeth of the ratchet gears. The alining-bar is controlled by an alining-bar cam lever 104. This cam lever is pivoted to the left-hand end of the alining-bar, as illustrated at 105.

Both of the projecting ends of the cam lever may have movement about the pivot 105. Assuming, however, as is ordinarily the case, that the pin 106 at the end of the upper projection of the cam lever 104, is held by the spring 107 in engagement with the extended surface of the cam 108, it will be apparent that the movement of the alining-bar is controlled by the lower projection 109 of the cam lever 104. This lower projection of the cam lever rides upon the surface of the locking cam 93. This locking cam is notched out as shown at 110, to receive the lower projection 109 of the alining-bar cam lever. When, therefore, the reverse button and its associated mechanism is in the neutral position, where the ratchet gears are out of mesh with the gear sectors and idlers, the alining-bar cam lever 104 permits the alining-bar spring 103 to force the alining-bar into mesh with the teeth of the ratchet gears. When, however, the reverse button is turned in either direction to throw the ratchet gearing into mesh with the actuating gearing, the lower projection 109 of the cam lever rides up upon the periphery of the locking cam 93, and, since the upper end of the cam lever 104 is fixed against rotation, the result is to withdraw the alining-bar from the position shown in Fig. 10, and to swing it into the position shown in Fig. 3. With the alining-bar in this position, the ratchet gears are freed to rotate under the control of the actuating gear mechanism. It will be noted that the notch 110 in the periphery of the locking cam 93 has a length such that the reverse button must be turned through a considerable angle in either direction before the alining-bar is withdrawn from its position in mesh with the teeth of the ratchet gears. This means that the movement of the reverse button will shift the ratchet gears into mesh with the gear sectors or idlers, before the alining-bar is withdrawn from its position between the teeth of the ratchet gears. The alining-bar thus positively preserves the alinement until the maintenance of the alinement is taken up by the gear teeth of the actuating mechanism. It will be apparent that the alining-bar cam lever 104 will withdraw the alining-bar from the teeth of the ratchet gears when the reverse button is thrown into the subtracting position, as well as when thrown into the adding position.

While it is true that, ordinarily, one of each pair of ratchet gears will be in engagement with the teeth of a driving sector or driving idler, and thus perhaps maintain alinement, the other gear of the pair is held in position merely by the ratchet mechanism, and in this ratchet mechanism there is some lost motion. If, therefore, the totalizer wheels are taken out of mesh with the ratchet gears while being returned to zero, the freed ratchet gears would in all likelihood slip out of alinement, and the totalizer wheels would probably not come back into mesh with the ratchet wheels when returned to the zero position and freed. The alining mechanism of my invention is arranged not only to maintain the alinement of the ratchet gears while being shifted from one position to another by means of the reverse button, but also to maintain the alinement of the ratchet gears whenever the totalizer numeral wheels are freed from their driving mechanism to be returned to their zero positions. The same cam lever 104 which serves to operate the alining-bar during the shifting reversal, serves also to operate the alining-bar whenever the numeral wheels of the totalizing register are set back to zero by means of the totalizer re-setting mechanism. It will be best, no doubt, to describe this totalizer re-setting mechanism before attempting to explain how the alining-bar cam lever co-operates with it to control the alining-bar.

It was explained that the numeral wheels of the totalizer are loosely mounted upon a totalizer spindle 4. This totalizer spindle stands normally in a definite angular position as determined by the pin 111, which drops into the notch of key-way in side-plate 2. The totalizer spindle 4 may have a limited amount of longitudinal motion within its spring in the side-plates. The cone-shaped bushing 112 is fastened rigidly to the totalizer spindle 4 by means of the pin 113. The numeral wheels, the register gears, and the carrying disks, are strung upon the totalizer spindle from end to end, with slotted bushings 114 between adjacent units. Therefore, the totalizer spindle spring 115, acting through the numeral wheels and bushings, forces the totalizer spindle from the right, to hold it in its normal position and to aid in returning it to its position when pushed to the left and turned through a complete revolution, as is necessary in re-setting the numeral wheels to zero. The cup 116 surrounds and protects the totalizer spindle spring 115; but it also serves the important purpose of limiting the sidewise motion of the numeral wheel units when the totalizer spindle is pushed to the left, in the act of zero re-setting. It will be noted that each register gear is provided with a pin $117a \ldots 117h$, projecting part way into the adjacent space. The totalizer spindle is provided with a series of short crank arms or pins 118, projecting through the slots in the spacer bushings 114. The longitudinal portion of these crank arms relative to the ends of the zero setting pins $117a \ldots 117h$, is such that under normal conditions, the numeral wheel units may be turned upon their common axis without interference with or from the pins 118. When, however, the totalizer spindle is pushed slightly to the left, and then turned in its bearings, the projecting cranks or pins 118 of the totalizer spindle will engage with the zero setting pins 117a ... 117h to pick up and return all of the numeral wheel units to the zero position shown in Fig. 6. Any numeral wheels which are at the zero position when the zero re-setting takes place, will simply be picked up in their zero positions and be carried around through a full revolution until they are again returned to their zero positions. The other numeral wheels will be in more or less advanced angular positions, but wherever they may be found, they will be picked up by the zero setting pins and carried around to their zero positions. When the zero position has been reached, the totalizer spindle spring 116 will act to force the zero pin or key 111, into the zero pin key-way, thereby making it a simple matter to stop the zero re-setting when the zero position has been reached. In order to effect this zero re-setting, it will ordinarily be necessary to disengage the register gears 5a ... 5h from the totalizer driving gears 9a ... 9h. It will be seen that for this purpose the space between the right-hand end of the cup 116 and the numeral wheel of highest order is sufficient to permit a slight shifting to the left of all of the numeral wheel units. This slight shifting of the numeral wheel units carries the teeth of the register gears out of mesh with the totalizer driving gears, thereby freeing the numeral wheel units to be turned upon the totalizer spindle 4. When the totalizer spindle has completed a single revolution in the act of zero re-setting, it moves to the right to assume its normal position, whereupon the teeth of the register gears must come back into mesh with the teeth of the totalizer driving gears. It is important, therefore, that the totalizer driving gears maintain their angular positions during this zero setting operation, when the numeral wheels are disengaged and out of mesh. Otherwise, the teeth of the register gears will not come back into mesh with the teeth of the totalizer driving gears when the re-setting is completed. I shall in a moment, describe how the alining mechanism is operated automatically to maintain the alinement of the totalizer driving gears during this zero re-setting operation, but before leaving the zero re-setting mechanism, it may be well to mention the fact that a ratchet wheel 119, cooperating with a ratchet pawl 120 (Fig. 3) is provided to insure the turning of the totalizer spindle knob 121 in the right direction. It may be noted also, that the left-hand ends of the spacer bushings 114 are given a conical bevel to reduce the amount of power necessary to overcome the friction between adjacent numeral wheel units.

Coming now to the matter of the maintenance of the alinement during the zero re-setting, Figs. 3 and 10 show a secondary alining-bar controller cam 108 against the more extended cam surface of which the pin 106 of the alining-bar cam lever normally rests. Figs. 3 and 10 show this cam 108 in its normal position. The cam 108 is rigidly secured to a shaft 122 which is pivotally mounted in the side-plates 1 and 2, the spring 107 tending not only to maintain the pin 106 of the cam lever 104 in engagement with the cam surface of the cam 108, but also to turn the shaft 122 in the direction of the arrow 123. At the right-hand end of this shaft 122, projects a crank arm 124. The front end of this crank arm is shown 85 in Fig. 6, where it appears that the under surface of the crank arm is beveled to rest upon the conical surface of the bushing 112. When, therefore, the totalizer spindle 4 is pushed to the left, the crank arm 124 rides up to the cylindrical surface of the bushing 112, thereby imparting a slight counter clockwise rotation to the shaft 122. This slight rotation carries the depressed portion 125 of the secondary alining-bar controlling cam 108 into a position opposite pin 106. Thereupon, the alining-bar spring 103 is permitted to carry the alining-bar into mesh with the ratchet gearing. This, of course, is under the assumption that the reverse button is in the adding or subtracting position (one of which is shown in Fig. 3); at least not in the neutral position as shown in Fig. 10. If the reverse button were in the neutral position as illustrated in Fig. 10, the alining-bar would already be in mesh with the ratchet gears and there would be no occasion for the secondary alining-bar controlling cam 108. But if, as will frequently be the case, the reverse button is in the adding position when the zero re-setting knob is turned, the secondary alining-bar controlling cam 108 will come into play to permit the alining-bar to drop into mesh with the teeth of the ratchet gears to maintain their alinement; and thereby the alinement of the totalizer driving gears, while the zero re-setting is accomplished.

I might call attention to what I consider an interesting feature of construction, whereby the same cam lever which is actuated at one end by the adding and subtracting button, or cam on this button, to pull the alining-bar out of mesh with the ratchet gears, is adapted to be actuated also from the other end under the influence of a secondary cam controlled by the zero setting button. A single part, therefore, serves to unlock the ratchet gears at all proper times, and to insure the locking of the ratchet gears and the associated mechanism at all times when such locking is necessary. I believe that, with one exception, I have now described the main features involved in the operation of the more purely calculating part of the mechanism. That one exception is the means whereby the totalizing register may be more or less automatically set up in reverse direction, thereby clearing the totalizing register and setting it back to zero, simultaneously with the printing of the total. I shall now explain this important feature, before cleaning up some incidental details.

The total having been enumerated in the totalizing register, it is ordinarily desired to print that total and at the same time to clear or re-set the totalizing register so that it will be made available for a subsequent calculation. The accumulated total might, of course, be read from the numeral wheels through the window 126 (Fig. 3). To clear the register and print the total, it would be possible to throw the reverse button into the subtracting position and then perfect a set-up of the actuating mechanism identical with the number read through the window as the accumulated total. This total number having been set up in the reverse or subtracting position, the numeral wheels of the totalizing register will have been set back to zero. The correctness of the set-up might be checked by an inspection of the numeral wheels to show that they all read zero. The proper set-up having been made, the operating lever may be actuated to print the total and return the actuating mechanism to its home position. To save time, however, I provide means for accomplishing this set-up more or less automatically. This means consists, first, of the total key 68 which the operator will depress when it is desired to print the total and clear the register. The total key is rigidly fastened to a total shaft 127 pivoted in the plates 1 and 2 and extending across the machine from side to side. Pivotally mounted on the idler spindle 29, is a set of totaling stop-dogs 128a ... 128h. These dogs are loosely mounted upon the spindle 29; they stand normally in the position illustrated in Fig. 3. Each one of the stop-dogs is connected by means of a flat spring 129 with the totaling shaft 127, whereby the depression of the total key 68 will put the springs 129 under tension, tending to force the upper ends of the totaling stop-dogs into engagement with the peripheries of the several numeral wheels of the totalizing register. Any attempt to use the total key without having thrown the reverse button into the subtracting position, will be frustrated by the surface of the cam 64, against which the foot 70 of the total key will press. If, however, the reverse button has first been thrown into the subtracting position, then the foot 70 of the total key will drop into the notch 69 of the cam 64, thereby permitting the totaling shaft 127 to turn sufficiently to bring the springs 129 into action to force the totaling stop-dogs into engagement with the peripheries of the numeral wheels. After the reverse button has been thrown into the subtracting position and the total key thereupon depressed, the operator, while holding the total key in the depressed position, pulls all of the finger pieces of the set-up or actuating mechanism as far as they will go in the forward direction. The angle through which the several gear sectors may thus be pulled, is automatically limited by the totaling stop-dogs. This is due to the fact that the periphery of each numeral wheel is notched as shown at 130a ... 130h (Fig. 6). The upwardly projecting ends of the stop-dogs when pressed forward by the total key, ride upon the peripheries of the numeral wheels in line with these notches. The length of the upwardly projecting arm of each stop-dog is such that the projection on the end of the stop will drop into the notch of the associated numeral wheel, when the numeral wheel is in its zero position. Some of the numeral wheels are, of course, likely to be in their zero positions when the total is to be taken. In all such instances, the projections at the upper ends of the arms of the stop-dogs will be forced immediately into the notches of the numeral wheels which are in their zero positions. This, of course, locks such numeral wheels against rotation, and an attempt to pull the finger piece of the associated gear sectors will be resisted, thereby showing the operator at once that no movement is necessary, or may be had. In the case of any numeral wheel which is not in its zero position, the finger piece of the gear sector may be, and is, pulled forward until the associated numeral wheel has been rotated back to its zero position, whereupon the projection at the upper end of the associated stop-dog will drop into the notch of the numeral wheel to arrest and prevent any further movement of the actuating mechanism. When, therefore, the total key has been depressed, the actuating gear sectors may be pulled forward through distances sufficient to return the several numeral wheels to their zero positions, but no farther. Since the gear sectors carry the printing segments, printing types corresponding in value with the amount of the accumulated total will be brought to the printing line, whereupon the actuation of the operating lever will effect the printing of the total accrued in the totalizing register. This automatic totaling device not only simplifies the operation, but tends to insure its accuracy.

In describing the operation of this automatic totaling mechanism, I have, for the sake of simplicity, assumed that the stop-dogs, acting through the notches in the numeral wheels, and thus through all of the gearing which connects the numeral wheels with the actuating gear sectors, supply the force necessary to oppose the operator's attempt to actuate the gear sectors beyond the positions which they must assume in order that the register will be exactly cleared. Such, however, is not precisely the fact in so far as the machine of my invention is concerned. Instead of subjecting the stop-dogs and totalizer driving gear mechanism to the shocks and strains necessary to perform the function as above outlined, I provide each stop-dog with a downwardly projecting tail piece 131a ... 131h. Each tail piece is provided at its end with a hook 132a ... 132h. Whenever a stop-dog is permitted to rotate in a counter clockwise direction (Fig. 3), the hook 132 is thrown up into engagement with a notch of a rack 133a ... 133h, etc., carried by and forming a part of each gear sector. The teeth of these ratchet sectors 133a ... 133h, have angular positions corresponding with the digit to digit angles of the numeral wheels. Whenever, therefore, the projection at the upper end of a stop-dog drops into the notch of its associated numeral wheel, the hook at the end of the tail of the same stop-dog is thrown into engagement with a tooth of the gear sector ratchet 133a ... 133h, whereby the tail of the stop-dog directly supplies to the gear sector the force necessary to arrest its motion. This not only relieves all strain upon the delicate gearing associated with the totalizer mechanism, but it eliminates the lost motion which must necessarily exist in a long gear train, and thereby stops the printing segments associated with the gear sectors more accurately in their printing positions than would be possible if the stopping of the gear sectors were determined by force transmitted all the way through the gear train. If I depended upon the upper ends of the stop-dogs as they drop into the notches of the numeral wheels, to arrest the movement of the gear sectors, etc., the force applied by the operator to each of the actuating levers would be resisted after having been transmitted through the whole train of gearing leading to the numeral wheels. This would throw a big load upon the gearing and tend to strain it. The totalizer wheel is run at a pretty high speed up to the instant when this movement is resisted, and if this movement is stopped by a pawl of some sort dropping into the zero notch, and this pawl is to supply the force necessary to arrest the motion of the whole train of gearing, the entire mechanism is subjected to a good deal of a shock. As a consequence, the construction must be made very heavy and strong, in order that these shocks may be withstood. By the use of the mechanism of my invention, all of this strain is avoided and I am permitted, therefore, to build the gearing and its associated mechanism both lighter and cheaper, and this in turn results in the added advantage of easy operation. In accordance with my invention, the numeral wheels act merely as controllers for other mechanism located at the logical place for arresting the movement of the gear sectors. The hooks at the lower ends of the tails of the stop-dogs, act directly upon the gear sectors, which may be regarded as sources of power; whereas in mechanism of the prior art, so far as I am aware, the source of power continues in action, and it is only at the end of a train of movements that the power is resisted. This is mechanically bad, whereas the scheme upon which my mechanism is based is mechanically right, in that it shuts off the power rather than permitting the power to act, and blocking it at the end of the route.

There are two detent mechanisms; one for the numeral wheels of the totalizing register, and another for the actuating mechanisms as represented by the gear sectors. Considering, first, the detent mechanism for the numeral wheels of the totalizing register, I have shown:

In Figs. 3, 6 and 11, a set of numeral wheel detents 134a ... 134h, one for each numeral wheel, or perhaps more strictly one for each totalizer driving gear unit; each detent pawl resting by means of the roller at its free end in the notches or depressions of the associated detent wheel 11a ... 11h. The lower end of each detent pawl is pivotally mounted in the detent pawl support 135 which is common to all of the detent pawls. A short and weak spring 136a ... 136h is interposed between each detent pawl and the common detent pawl support. A comparatively stiff spring 137, is attached at one end to the detent pawl support, and at the other end to the side plate 2, to exert a pressure upon the detent pawl support 135, tending to turn it in a clockwise direction (Fig. 3 and Fig. 11). The lower end of the detent pawl support is pivoted in the side plates at 138 and 139. This detent mechanism engaging, as it does, the notches in the peripheries of the detent wheels of the driving carry-over units, prevents an otherwise possible overthrow of the numeral wheels and keeps the numeral wheels in perfect angular alinement. When any numeral wheel with its carry-over and driving unit is turned, the detent pawl individual to that numeral wheel is forced slightly in a counter clockwise direction (Fig. 11), in order that the roller at the free end of the detent pawl may pass over the tooth or teeth of the detent wheel 11*a*, 11*b* or 11*h*. The upper ends of the detent pawls rest against the upper end of the detent pawl support. When, therefore, one of the detent pawls is pressed away from the detent wheel, the detent pawl support is turned back away from the detent wheels to the same angular degree. This will at once release all of the remaining detent pawls from the high pressure of the detent pawl support as caused by the detent pawl support spring 137. Each individual detent pawl will, however, continue to exert a nominal pressure upon its detent wheel, due to the action of its individual weak spring 136*a*, 136*b*, or 136*h*. The result is that, when a carry-over occurs from one order to another, the carry-over wheels will not have to overcome a great deal of detent pressure, since the detent wheel of the directly actuated order has already taken the tension of the powerful spring 137 off from all of the other detent wheels. The arrangement, however, gives a good, stiff detent action under the normal condition of operation when a single numeral wheel is being advanced. Under such conditions, the whole effect of the stiff detent spring 137 is brought to bear upon detent wheel of the numeral wheel which is being advanced. It is desirable that there should be a good stiff detent mechanism to prevent the overthrow and to maintain the necessary alinement. If, however, each numeral wheel were provided with a wholly independent detent pawl, each under the actuation of a good stiff spring, the operation would be entirely satisfactory when a single numeral wheel is advanced, but in case a carry-over occurs, particularly a carry-over involving the simultaneous movement of several numeral wheels, the load of a correspondingly large number of individual detents will be too great to permit the carry-over to occur with any degree of facility. The use of the differential detent mechanism of my invention secures all of the advantages of the stiff individual detents, but avoids the objections to the stiff individual detents when a carry-over occurs, the reason being that the first, or lowest order wheel will raise not only its individual detent, but will in turn, raise the common detent plate or support 135, thus relieving the greater part of the pressure upon all of the other individual detents. This permits the carry-over to occur under the small detent pressure or resistance afforded by the weak springs 136*a* . . . 136*h* of the individual detent pawls. As soon as the tip of the tooth of the detent wheel of lowest order has passed beyond the roller to its individual detent pawl, this associated individual detent pawl begins to drop down into the space between the teeth of the detent wheel. This releases the common detent plate or support and permits it to be drawn forward into action through the tension of its actuating spring 137, thereby causing the detent pawl support to exert its pressure upon the other individual detent pawls to bring them sharply into their resting positions between the adjacent teeth of the other associated detent wheels. The stiff actuation of the detent pawls of higher orders, which thus come into play at the time when their motion should be stopped, prevents any overthrow which might otherwise occur.

This differential detent mechanism is of peculiar advantage in connection with the multiple ratio carry-over gearing which was explained in the early part of this specification. The fact that the carry-over mechanism is geared up to drive the numeral wheels which are carried at a progressively higher speed than that of the numeral wheel which is directly driven, means, necessarily, that the power available to drive the carried numeral wheel is less than that available to turn the directly driven numeral wheel. Such being the case, it is important that the numeral wheels of higher orders be not forced to overcome a heavy detent resistance when being advanced from one position to another. On the other hand, the high speed at which the carried numeral wheels are turned, makes it doubly important that a stiff detent mechanism come into play to arrest the motion at the proper time in order to prevent overthrow. The differential detent mechanism of my invention, acts automatically to reduce the detent resistance upon any carried order wheel during its movement from one position to the next, under the influence of a driven numeral wheel of lower order, but it acts also to put a heavy detent pressure, or resistance, upon the carried numeral wheel from and after the instant when the detent mechanism begins to drop down into the space corresponding with the position in which the numeral wheel must have its motion arrested.

While I believe this whole differential detent mechanism is broadly new, there is an incidental detail which is of some importance. This consists in the placement of the spring 137 of the common detent plate or support, at the right-hand side of the machine. The carry-over between numeral wheels always occurs from right to left. When, therefore, any numeral wheel is advanced, its individual detent pawl forces the common bar or plate back against the spring tension of the spring at the right-hand end of the bar. Since the bar 135 is made of sheet metal and is, therefore, slightly flexible, there is a slight twist of the bar, the left-hand end of the bar being forced back slightly farther than the right-hand end, which is subjected to the advancing spring tension. This defeats any tendency which there might otherwise be for the detent mechanism to stick on the points of the detent wheels of higher orders.

I shall now describe the retainer or detent mechanism which acts to insure the return of the key levers and gear sectors fully to their normal positions, and to keep them there when the universal bar is advanced. This retainer mechanism may desirably be formed of a single piece of sheet metal extending across the machine from side to side, and fastened by means of the lugs 140 to the side plates. The sheet metal retainer bar 141 is formed with a set of individual retainer or detent spring points 142a ... 142h. The tip ends of these individual detent springs are adapted to rest in notches 143a ... 143h, formed in the peripheries of the auxiliary gear sectors 27a ... 27h. These gear sector detent springs serve not only to insure the return of the gear sectors fully to their zero positions and to keep them there when the universal bar is advanced, but they serve also to provide a sort of friction which must be overcome before the gear sectors may be advanced, and in this way they tend to insure the proper depression of the stop keys which determine the degree of swing which may be given to the gear sectors. Since it is necessary to overcome this friction of the gear sector detent before starting the movement of the gear sector, a certain increased amount of momentum will be given to the gear sector and the associated parts when their actual movement begins, and this momentum thus will be helpful in overcoming the extra load imposed upon it whenever a carry-over takes place.

There is one other more or less incidental feature which pertains strictly to the calculating part of the mechanism; viz., a set-up register. This set-up register is not a positive necessity, since it serves merely to display the amount for which the gear sectors may be set up at any time. This in a measure is indicated by the positions of the key levers or finger pieces 14a ... 14h. It is, however, a little difficult to read the showing furnished by these finger pieces. I have, therefore, provided a set-up register shaft 145, upon which I mount loosely a set of numeral wheels 146a ... 146h. Each of these numeral wheels is geared permanently to the associated main gear sector. The numeral wheels comprising this set-up register, have no carry-over mechanism. The numeral wheels serve, therefore, merely to display through the window 147, the angular position in which the associated gear sector stands. When an operator wishes to set up any given number, he pulls the finger pieces of the gear sectors forward until the movement of the gear sectors is stopped by the stop keys which have been depressed. The operator will find it convenient to check the correctness of the set-up by reference to the indications of the numeral wheels on the set-up register as displayed through the window in the front of the casing.

I have now described all of the features of the more purely calculating part of the mechanism. I shall, therefore, proceed to a description of the mechanism involved in the operation of printing.

Fig. 2 illustrates in a broad and general way, the fact that the calculating part of the mechanism may be mounted upon the listing base in such a way as to swing at the pivots 151 and 152. These pivots pass through holes in the side plates 1 and 2 of the calculating part of the machine which register with holes 153 and 154 in the side plates 155 and 156 of the listing base. The pivots may be withdrawn from the registering holes where the side plates of the two parts of the mechanism overlap, thereby permitting the ready removal of the calculating part of the machine from the listing base. The mechanism for withdrawing these pivots, comprises the pivot pin levers 157 and 158, into which the heads of the pivots are riveted. These levers at the other ends are attached to the disconnecting rod 159, which is slidably mounted in holes 160 and 161 in the side plates 155 and 156 of the listing base. A spring 162 serves normally to push this rod and its attached reverse and pivot pins, to the left. The knob 163 may, however, be grasped to pull the rod to the right, thereby withdrawing the pivot pins 153 and 154 from the registering holes in the side plates of the two parts of the machine. When the pivot pins are withdrawn, the calculating part of the machine may be lifted off the base. In the ensuing description, it will be assumed that the two parts of the machine are pivotally connected by means of the pins 153 and 154 as shown in the drawings.

As previously stated, my method of printing an impression corresponding with the set-up, involves a slight downward movement of the entire calculating part of the machine relative to the listing base. The rocking movement and mechanism are controlled by the operating lever 74. This operating lever is keyed or pinned to the gear sector shaft 13. This shaft carries a bracket 163 at its left-hand end just inside the side plate 1, the bracket being fixed to the shaft 13. When, therefore, the operating lever is pulled forward, it will rotate the bracket in a clockwise direction (Fig. 3). A pawl 164 is pivoted to the bracket 163 and is pressed against the ratchet wheel 165 by means of the small spring 166. The advancement of the operating lever thus causes a clockwise rotation of the ratchet wheel 165 corresponding with the movement of the operating lever. The ratchet wheel 165 is attached to a printing gear 167, the teeth of this gear being in mesh at all times with the teeth of the printing pinion 168. This printing pinion is rigidly secured to the printing cam shaft 169, which in turn is rotatively mounted in the side plates 1 and 2. Rigidly mounted also upon this printing cam shaft 169, are a pair of printing cams 170 and 171. The gear ratios are such that each full stroke of the operating lever will cause a half revolution of the printing cam shaft 169 in the direction of the arrow 172 of Fig. 3. The printing cams 170 and 171 rest upon and coöperate with the printing cam levers 173 and 174, which cam levers are pivotally mounted at 175 and 176 of the side plates 1 and 2, respectively. Each of the cam levers have feet 177, which rest upon the cylindrical hubs of the "non-printing" cams 178 and 179. These non-printing cams are rigidly mounted upon a shaft 180, having bearings in the side plates 155 and 156 of the paper feeding section of the machine. This shaft is provided also, with a "non-printing" lever 181, which when depressed will rotate the non-printing cams 178 and 179 to swing them into positions such as to raise the front end of the calculating section of the machine and swing it slightly backwardly about the pivot pins 151 and 152, the sidewise location of the non-printing cams 178 and 179 being for this purpose directly underneath the lower edges of the side plates 1 and 2 of the calculating section of the machine. It will be apparent that the cylindrical hubs of the non-printing cams furnish satisfactory supporting points for the feet of the printing cam levers 173 and 174 which lie directly inside the side plates 1 and 2. A long flat spring 182, is mounted on the top of the type segment guide bar 50, in such manner that the two opposite ends of the spring will engage the printing cam levers 173 and 174, thereby tending to swing these levers in a counter clockwise direction about their pivots 175 (Fig. 3), and thus cause these cam levers to exert a pressure upon the printing cams 170 and 171.

When, therefore, the printing cams 170 and 171 are given a half revolution in a counter clockwise direction (Fig. 3) upon the actuation of the operating lever 74, the entire calculating section of the machine will drop down toward the paper feeding section, as soon as the points of the cams 170 and 171 have passed beyond the corners of the printing cam levers 173 and 174. The type segments having previously been brought to their proper positions in the act of establishing the set-up, the type corresponding with the set-up will strike the paper, which, as presently to be described, is fed beneath the printing point by the paper feeding section of the machine. The continued movement of the printing cams 170 and 171, thereupon begins to elevate the calculating section of the machine, which on the completion of the half revolution of the printing cams, is restored to its fully elevated position, as shown in Fig. 3.

In order that the type, or type segments, may effect an imprint upon a strip of paper fed beneath the printing point, I provide an inked ribbon feeding mechanism, which comprises two ribbon spools 183 and 184, mounted upon ribbon spool shafts 185 and 186, as best illustrated in Fig. 4. These shafts are mounted in the side plates 1 and 2, and are provided with key-ways 187 and 188, whereby the ribbon spools, although keyed to the ribbon spool shafts, may be adjusted from side to side. The ribbon spools are held in place by a ribbon carriage consisting of two side-plates 189 and 190, and two bottom plates 191 and 192, the bottom plates being riveted to the side plates as best illustrated in Fig. 4. A two-color ribbon 193, is wound about the ribbon spools and under the bottom plates 191 and 192, as best shown in Fig. 4. The ribbon carriage is provided with a handle 194, which as shown in Figs. 1 and 4, extends to the front of the machine, whereby the ribbon carriage, and thus the two-color ribbon, may be given a lateral adjustment relative to the group of printing segments which remain in fixed lateral position relating to the calculating section of the machine. When the ribbon carriage is shifted fully to the right, as shown in Fig. 4, it will bring the black section of the ribbon under the printing segments, thereby causing a black impression to be imprinted upon the actuation of the operating lever. If the ribbon carriage be shifted by the handle 194, fully to the left, it will print the impression in, say, red. The ribbon may be shifted from side to side to correspond with the listing of additions or subtractions. The sidewise adjustment of the ribbon carriage and ribbon, is limited by the stops 195 and 196. I provide, also, a series of notches 197, in the lower edge of the front plate of the machine. The springing handle 194 of the ribbon shifting lever drops into these notches. The notches are spaced to correspond with the spaces between the printing positions of the several printing segments, whereby the two-color ribbon may be shifted so as to make the color division line of the ribbon fall between any two of the printing segments. This is convenient in printing decimals, for example, where all of the figures to the left of the decimal point may be printed in black, and all of those to the right of the decimal point, in red. The ribbon may be shifted laterally to correspond with a decimal point between any two significant figures within the range of the machine. Since such a machine is most likely to be used in calculations involving dollars and cents, I have made the second notch 197 from the right, somewhat deeper than the others, in order that the handle of the ribbon shifting mechanism may be particularly readily stopped in the position corresponding with the printing of the two right-hand figures in red, while the others are printed in black.

Fig. 5 illustrates in cross-section, a ribbon spool and the means for fastening the ribbon to the spool. This consists simply of a clamp 198, which clamps the end of the ribbon to the spool. In order that the printing ribbon may be advanced to bring new parts of the ribbon to the printing line, I have provided a ratchet wheel 199 at the right-hand end of the ribbon spool shaft 185. A ribbon spacing pawl 200, guided by a pin 201 in the right-hand side plate, is pivotally connected at its upper end with the operating lever 74, as best illustrated in Fig. 11. The lower end of the pawl 200, is bent over to the left, in order to bring the end of the pawl in mesh with the teeth of the ratchet wheel 199, upon the depression of the operating lever 74. The ribbon is, therefore, advanced through a slight angle upon each actuation of the operating lever. The ribbon spool 183 being keyed to the ribbon spool shaft 185, insures the turning of the spool as the shaft is rotated. The rear ribbon spool 184 is also splined upon its shaft 186, and since this shaft is provided with a projecting knob 202, the ribbon can be rewound upon the holding spool by turning the knob. The tongues 189a on each side of the ribbon spools furnish a light pressure against the spools to keep the ribbon under tension. Having now described the printing part of the mechanism and the operations involved in printing, I shall describe the mechanism which holds the paper upon which the record of the calculations is printed. This comprises essentially, a paper roll holder and mechanism actuated in conjunction with each printing operation to feed the strip of paper an amount sufficient to permit the distinct impression of the next set-up of the type segments.

The roll of paper is shown at 203. It has no spindle or shaft, but merely rests in a pocket having a front cover 204, hinged at 205. The upper edge of the front cover may be swung out of engagement with the casing, whereby a new roll of paper may be inserted. The outer end of the paper roll passes through a guide 206 to the feeding roll 207, on which a pivoted idler roll 208 rests to grip the paper. The paper passes thence over the top of the rubber faced printing platen 209, and thence over the top plate 210 of the base section to the outside. At 211, I have provided a serrated tearing edge, which is useful in tearing off the printed strip of paper which has been fed out of the machine. The means for spacing the feeding roller, and hence the paper, are operated by the rocking of the machine when printing. The paper feeding roller 207 has a ratchet wheel 212 at the left-hand end. The reciprocation of the pawl 213 engages the ratchet teeth to advance the roller. This paper advancing pawl is pivotally mounted at the end of the feed lever 214, a spring 215 tending to throw the pawl into engagement with the teeth of the ratchet wheel 212. The reciprocating rod 216, is pivotally connected at its lower end with the lever 214. At its upper end, it hooks over the pin 217 fastened in the side plate 1 of the calculating part of the mechanism. A spring 218, acts to pull down the reciprocating rod and the printing lever pivotally attached thereto. When, therefore, the pin 217 moves down with the calculating part of the machine, as in the act of printing, the spring 218 draws down the reciprocating rod a corresponding amount, and carries with it the pawl 213. This pawl, being freed from the influence of the stop end 219, moves into engagement with a ratchet tooth of the wheel 212, whereupon the subsequent upward movement of the calculating part of the machine, after the printing has been accomplished, causes the reciprocating rod to be pulled back into its normal position as shown in Fig. 3, the pawl 213 advancing the ratchet wheel, and with it, the roller and the paper which is fed thereby. The ratios are made such that the paper will be advanced a space sufficient to cause the imprint of the next number to clear the last number printed. The pin 219 acts upon the ratchet pawl 213 to hold it out of engagement with the ratchet wheel when the printing lever 214 is in its upper position. The pin 219a performs a similar function when the printing lever is in its lowermost position. A detent 220, having a roller 221, is provided to engage the teeth of the ratchet wheel 212 to effect the final alining or spacing of the paper. The spring 222 acts upon the detent to cause roller 221 to find the lowest point of the ratchet and thereby locate the paper in proper position.

When it is desired to tilt the calculating part of the machine away from the paper feeding base, as for example, when it is desired to inspect the number last printed, it is necessary to push the disengaging lever 223. This lever is pivoted to the side plate 1, and carries an arm 224, which engages with one of a pair of printing lever hooks 225, one such hook piece being fastened to either end of the hook spindle 226. Each hook piece carries a hook 227, which normally engages a projection upon the associated printing lever 173. When the disengaging lever 223 is pushed in toward the machine, the hooks 227 are withdrawn from the position in which they will engage the printing levers 173. The downwardly extending arm 228 of the printing lever hook engages the extension 229 of the reciprocating bar 216 to turn it a slight distance in a counterclockwise direction (Fig. 3), whereby the hook at the upper end of the reciprocating rod is disengaged from the pin 217. The calculating part of the mechanism having in this way been disengaged from the paper feeding mechanism, may be swung backwardly about the pivots 151 and 152. When the calculating part of the machine is returned to the normal position shown in Fig. 3, the hook 216 is automatically snapped over the pin 217, and the hooks 227 at the ends of the hook pieces 225 are snapped over the projections at the ends of the printing levers 173. A spring 230 acts upon a pin, set in the downward projection 228 of the printing lever hook, to hold it normally in the position shown in Fig. 3. The sheet metal plate, at the end of which the tearing edge 211 is formed, is extended back over the paper feeding mechanism to form a cover therefor. It is provided with an opening at its center, in order that the printing may be accomplished. This plate protects the paper from smudging, due to the presence of movement of the inked ribbon.

A paper feeding knob 231 is attached to the left-hand end of the spindle upon which the paper feeding roller 207 is mounted, and this knob may be employed in advancing the paper, independent of the printing. I have found it desirable, however, to add a mechanism, which when operated, will advance the paper an amount sufficient to carry the last number printed out beyond the tearing edge, so that upon the operation of this automatic mechanism, the paper may be torn off immediately, with the assurance that it will have been advanced far enough to bring the whole of the printed record beyond the tearing edge. This advancing mechanism comprises an auxiliary ratchet wheel. A supplementary ratchet wheel 233 is mounted upon the shaft of the paper feeding roller 207. This is adapted to be engaged by a ratchet toothed rack 234, when driven toward the front of the machine under the influence of a crank arm 235 operated by the paper advancing lever 236. This paper advancing lever may, therefore, be pulled toward the front of the machine, whereupon the rack and ratchet mechanism will come automatically into play to advance the paper an amount sufficient to carry the number last printed out beyond the tearing edge. The projecting end of the paper may then be torn off to show the whole of the record thus far printed.

When the machine is thrown into the non-printing condition by the actuation of the non-print lever 181, the whole of the calculating part of the mechanism is prevented from rocking upon the paper feeding base. Since it is the rocking of the calculating part of the mechanism which controls the advancement of the paper strip, there will be no advancement of the paper when the machine is set for totalizing, unaccompanied by a printing of the numbers entering into the calculation.

The method of inspecting the printing line on the paper strip is, I believe, new and valuable. It is unnecessary to advance the paper and then return it to the printing position on the platen, nor is it necessary to move the paper feeding mechanism in any way.

The paper feeding base is provided with a pair of rollers 240 at the back, and with a pair of rubber feet 241 at the front. This makes it easy to handle the machine upon a desk, where it is frequently desired to move it from place to place. It is only necessary to raise the front end of the machine, when it can be drawn into a position near the operator. When the lower end is dropped, the rubber feet will prevent the machine from slipping or moving. The rollers at the back, permit it to be wheeled easily from place to place when the front end is raised.

This, I believe, completes the description of one form of the calculating part of the mechanism, as applied to one form of paper holding and feeding mechanism. There are certain modifications to the calculating part of the mechanism which I wish to describe in detail, but before doing so, I shall illustrate the manner in which the calculating part of the machine may be applied to be used in conjunction with paper holding and feeding mechanisms of various kinds.

In Figs. 19 to 23 inclusive I have shown the calculating machine part of the mechanism as applied in printing on flat sheets of paper such as books or forms intended for bank statements, sales sheets or for tabular work of various kinds. For this purpose I have provided a table 300 with one or more sets of rails 301 and 302, each set of rails being pivotally and adjustably mounted upon a rod 303 carried by the table. The thumb screws 304 and 305 serve to clamp the rail sets in desired lateral position upon the cross bar. Each set of rails is adapted to guide a carriage in which the calculating part of the machine may be mounted and held in place by a rod 306 which takes the place of the pins 151 and 152 as shown in Fig. 4. The carriage with the calculating machine may be shifted in either a forward or backward direction, while the rails themselves permit of any desired sidewise adjustment. In this way it becomes possible to use sheets of paper of any desired size and to cover any part of them with the imprint of the calculating machine mechanism. The cross rod 303 is preferably pivoted by brackets 307—307 to the table. A spacing mechanism is provided in the carriage whereby the calculating machine may be started at the top of a column whereupon it will space itself forward from line to line by merely actuating the operating lever in the ordinary manner. This spacing mechanism comprises a cam 308 mounted upon the end of the shaft 13 to which the operating lever 74 is pinned or keyed. This cam is best shown in Fig. 19. As the operating lever is pulled forward the cam 308 forces the ratchet pawl 309 backward thereby bringing a tooth of the ratchet pawl in contact with the tooth of a ratchet wheel 310. The initial part of the backward movement of the ratchet pawl 309 disengages the end of the pawl from the pin 311 which tends normally to hold the ratchet pawl in its lower position as shown in the drawing. This pin 311 is for the purpose of locking the carriage against movement during the printing operation.

It is to be noted also that the opening in the pawl 309 is greater than the width of the engaging part of the cam 308. This permits the operating lever to have a sufficient amount of forward motion to insure the completion of the printing before the movement of the cam pawl 309 is begun. As the operating lever is returned to its normal position the cam 308 engages the right hand side of the notch 312 to pull the cam pawl 309 in a forward direction whereby a tooth of the ratchet wheel 310 is engaged to cause a certain definite amount of rotation of the ratchet wheel 310. This ratchet wheel is keyed to a shaft 313 upon which is mounted a pair of carriage feeding pinions 314. These pinions engage with the teeth of the racks 315 which form parts of the rails upon which the carriage is carried. The weight of the carriage is preferably carried upon rollers so that the feeding pinions 313 serve merely the function of controlling the advancement of the carriage and the mechanism supported thereby.

To provide an easy means of shifting the carriage from place to place upon the rails I have provided a clutch shown in detail in Fig. 22. This is intended to control the mechanical connection between the feeding gears 314 and the ratchet wheel 310. The feeding gears 314 are rigidly attached to the shaft 313, whereas the ratchet wheel 310 is loosely mounted upon the shaft. The ratchet wheel is provided with a toothed hub 316. Upon the shaft 313 is mounted a slidable clutch member 317, rotation between this clutch member and the shaft 313 being prevented by the pin and slot engagement 318. The spring 319 normally presses the teeth of the clutch member 317 into engagement with the teeth of the hub 316 of the ratchet wheel. When the yoke 320 is operated to force the clutch member 317 toward the right the engagement between the two toothed surfaces of the clutch is broken, whereby the carriage may be pushed forward or back without turning the ratchet wheel 316. The clutch is of a friction clutch type except that to overcome the weak points of the friction clutch and still maintain the fine division points, the clutch members are provided with teeth. One of the clutch members, however, has one tooth less than the other with the result that the tooth absolutely opposite the notch of the other member will engage said notch. The remaining teeth, however, will only partially engage the opposite notches, while the one tooth on the opposite side of the engaging tooth will meet the high tooth of the other clutch member. To facilitate this engagement between the teeth of the clutch members the hole in the clutch member 317 is tapered as shown in dotted lines at 321. The taper of the hole permits the tooth faces of the clutch members to come into firm engagement with one another no matter what the angular relation of the two parts of the clutch member may be at the time of such engagement.

The yoke 320 is mounted upon a separate shaft and connected with a cam lever in such a way that the turning of the cam will cause the yoke 320 to force the clutch members apart, whereupon the carriage is freed to be moved either forward or back. The lever 322 for disengaging the spacing mechanism is adapted to be operated manually, but it is so arranged that it will be engaged when the calculating part of the machine is rocked back from the printing position to expose the printing line. If then a little extra pressure is applied to the calculating part of the machine the lever will be forced backward to operate the yoke to disengage the spacing mechanism. The carriage may then be rolled to any desired line or point upon the paper underneath the rails. The calculating machine being tilted back enables the printing line to be brought into the desired position. As shown in Fig. 21, the calculating machine is mounted in the carriage and the carriage is in turn held in place upon the rails. A set of rollers 323 provides easy running of the carriage upon the rails.

I shall further illustrate the applicability of the calculating part of the machine to paper feeding devices of different kinds by reference to still another form of paper feeding mechanism. This paper feeding mechanism is of the cylindrical platen type, as illustrated in Figs. 24, 25 and 26. This form of paper feed is particularly adapted for billing work and for various kinds of special tabulation. The main advantage of this form of paper feeding mechanism over the one last described lies in the fact that the paper may readily be shifted in a sidewise direction as well as in a forward and back direction. While the drawings show but a single calculating machine mounted upon this paper feeding base, it is obvious that any number of calculating machines may be attached to the base within the limits prescribed by the width of the base.

I have illustrated a simple platen paper feeding mechanism mounted between the side frames 401 and 402. The knobs 403 and 404 mounted at either end of the cylindrical platen 405 provide means for turning the platen by hand. The paper is fed into the machine at 406 and is held against the platen by a paper shield 407 and the feed rollers 408 and 409, the upper part of the paper shield guiding the paper to the printing point, which is at the top of the printing bar 410. A rubber cushion 411 is provided at the top of the printing bar to prevent the type from being battered upon the metal of the bar. In order to facilitate the easy adjustment of the paper upon the platen I have provided a feed roller release. This comprises a pivoted release rod 412, which is mounted in the side plates and flattened at either end to pass between the short ends of the feed roller levers 413 and 414, which are mounted to turn about the pivot 415, as best illustrated in Fig. 25. A short spring shown also in this figure, normally acts to bring the rollers 408 and 409 into engagement with the cylindrical platen 405. When the release rod is turned by means of the release lever 416, the short ends of the feed roller levers are spread apart to withdraw the feed rollers from their engagement with the platen.

In Fig. 26 I have shown in detail the ratchet arrangement for the platen. This is preferably located at the right-hand end of the platen. The cylindrical platen is provided with a ratchet wheel 417, into which drops the ratchet roller 418 mounted at the end of the ratchet lever 419. The ratchet lever is pivoted to the side frame at 420 and is pulled into engagement with the ratchet wheel of the platen by means of the spring 421. A cam lever 422 is pivoted also to the end of the ratchet lever 419. When this cam lever is in the normal position shown in the drawing, the roller 418 is permitted to drop down between the teeth of the ratchet wheel. When this cam lever is pressed forward, however, the friction surface 423 is turned into a position where it will ride upon the friction disk 424' of the cylindrical platen. The cam surface 423 is more distant from the pivot point 418 than is the normal surface 424 of the cam lever. When, therefore, the cam lever is pulled forward the roller 418 is so far withdrawn from the axis of the cylindrical platen that it will not drop into the spaces between the teeth of the ratchet wheel. The spring 421 acts, however, to press the friction surface 423 into engagement with the friction disk 424, whereby a light friction is present to steady the movement of the cylindrical platen when turned by hand.

The side frames 401 and 402 are fastened to the rails 425 and 426, these rails being mounted in the base plate 427, whereby the side frames and everything mounted upon or between them may slide from side to side. A handle 428 pivotally mounted at 429 is held in the normal position shown by means of the spring 430 in engagement with a tooth of the V-shaped notch bar 431, thereby locking the carriage against sidewise movement. Upon depressing the handle 428, however, the carriage is released, whereby it may be shifted to any sidewise position desired. The pins 432 facilitate the stopping of the carriage at any desired point. These pins may be inserted in equally spaced holes wherever required for the work in hand, and the handle 428 being provided with a stopping projection 434, the machine may be shifted sidewise until the projection 434 comes into engagement with the required pin, whereupon the handle may be released to permit the rearward end of the lever which forms the handle to engage a tooth of the notch bar 431 to bring the carriage accurately to the desired position. The more strictly calculating machine part of the mechanism is pivotally mounted upon a pair of side plates 435 and 436, these side plates being integral with or rigidly attached to a back plate 437 which is slidably mounted upon the supporting rail 438 at the back of the base 427. A thumb screw 439 serves to clamp the calculating machine frame in the required position.

This paper feeding base permits the reception of paper of any width within the limits prescribed by the length of the cylindrical platen. It permits this paper to be shifted sidewise or vertically as may be required to bring any desired part of the paper beneath the printing position of the calculating machine. The sheets of paper may readily be inserted into the paper feeding mechanism and as readily withdrawn therefrom. It will be apparent that the calculating part of the machine is adapted to be applied in a somewhat similar manner to paper feeding devices of styles or types other than those herein specifically described.

I have now described one form of the calculating machine mechanism of my invention and have illustrated its applicability to paper feeding mechanisms of various kinds. I should like now to describe certain modifications of the calculating machine part of the mechanism. The first to be considered is that involving the keyboard or setting mechanism. In the mechanism previously described the keyboard was of the multiple bank type; that is to say, a key stop was provided for each unit of each order. In Figs. 16, 17 and 18 I have illustrated key levers connected with the actuating sectors not essentially different from those previously described. There is, however, but a single bank of stop key mechanism. In other words, there is but one key for each digit common to all orders. As shown in Figs. 16 and 17, the key stop buttons 501, 502 ... 509, preferably numbered as shown in Fig. 16, are pivoted upon the pins 510 mounted in the left-hand side plate, each lever button being provided with a returning spring 511. There is a connecting rod 512 pivotally connected at 513 to the short crank arm 514 which is keyed to the rock shaft 515. This connecting rod is provided with a series of projections 516, each projection being adapted for engagement by one of the button levers 501 ... 509. The pins 517 are fixed in the left-hand side plate in position such as to permit the various lever buttons to have various degrees of angular movement dependent upon the digits which they represent. Thus the degree of downward movement which may be imparted to the connecting rod by a depression of the button lever marked "1" is less than that which may be imparted by the lever button marked "2". A depression of the lever button marked "3" will impart a still greater angular movement to the connecting rod 512 and thus to the rock shaft 515. A pin and slot mechanism 518 at the upper end of the connecting rod permits the necessary longitudinal movement thereof. The slots 510' in the lever buttons 501 at their pivot points 510 are designed to permit a longer stroke of the lever buttons than is actually necessary. This insures the required degree of downward movement of the connecting rod without giving the operator the feeling of pressing against a solid stop.

Rigidly mounted upon the rock shaft 515 are a series of toothed stop levers 519 best illustrated in Figs. 16 and 18. The number of these stop levers corresponds with the number of actuating sectors whose actuating levers 520 project through slots 521 in the front of the casing. The stop levers are provided with a series of stop ledges 522. The stop ledges of each stop lever are intended to engage the stop pin of the associated gear sector, as for example 28a shown in Fig. 18. If the rock shaft 515 is turned through but a small angle due to the depression of the lever button 501, the pin 28a will engage the first ledge 522 of its stop lever 519 when the gear sector is drawn forward by manipulation of the lever 520. If the lever button numbered "4" had been depressed, the angular rotation of the rock shaft 515 would have been such as to permit the gear sector to swing forward until stopped by an engagement of the pin 28a with the fourth stop ledge of the stop lever 519.

The operation of setting up any required number is, therefore, as follows: The lever button corresponding with the digit in the highest order of the number to be entered is depressed, whereupon the gear sector of that order is advanced until it comes to a stop. Thereupon the lever button corresponding with the digit in the next order is depressed and the gear sector of this order is pulled forward until it comes to a stop. In this way the complete set-up is effected.

The set-up having been established in this way, the operating lever 74 is pulled forward. This operating lever is provided with a pin 523 which engages the cam surface 524 upon a cam lever 525 rigidly mounted upon the rock shaft 515 at the right-hand end thereof. The effect of this engagement is to turn the rock shaft 515 firmly in a clock-wise direction (Fig. 18), whereby the notches of the stop levers are forced into complete engagement with the stop pins 28a ... 28h of the gear sectors to effect the perfect alinement of the gear sectors and printing segments. It will be noted that the notches in the stop levers are narrow at the bottom to effect this more perfect alinement of the gear sector mechanism. While the pin 523 upon the operating lever traverses the length of the cam 524, the printing operation is effected in the manner previously described. The pin 523 having passed beyond, the cam 524 engages the reverse cam surface 526. This engagement causes the cam lever 525 and with it the rock shaft 515 and its mechanism to be swung in a counter-clockwise direction to disengage the pins of the gear sectors from the notches of the stop levers 519. The cam lever 525 is swung so far in this counterclockwise direction that the tip 527 of the cam 524 engages the notch 528 at the end of the pivoted retaining pawl 529. The cam lever 525 and the rock shaft mechanism being thus retained in a depressed position, the operating lever 74 is permitted to return to its normal resting position and to carry with it in returning all of the gear sectors, the pins 28a ... 28h being freed for this purpose from the notches of the stop levers 519. As the operating lever approaches its home position it engages the foot 530 of the retaining pawl 529 to throw the notch 528 out of engagement with the tip 527 of the cam 524, whereby the stop mechanism is permitted to swing up into its normal resting position, as shown in Fig. 18, under the influence of the returning spring 531.

From a manufacturer's standpoint the advantage of the above described mechanism resides principally in the fact that it reduces the number of necessary parts and it permits a single set of stampings to be used for all orders. From the standpoint of some operators there may be an advantage in the provision of a single set of lever buttons which may be used to limit the movement of the gear sectors of all orders.

In concluding this description of my invention I wish to refer to certain modifications of the setting-up mechanism and the operating lever and the mechanism associated therewith. These modifications are illustrated in Figs. 27 and 28. The first feature to which I shall give detailed attention is a means for locking the key levers or sectors in the positions to which they are advanced until after the printing has been accomplished. In the machine as previously described it would be possible to pull down a key lever, thus actuating the totalizer mechanism, and then to return the key lever part or all of the way back to its normal position before effecting the printing by the actuation of the operating lever. This would mean that the operator would not necessarily print the numbers added in the totalizer. The modified mechanism which I wish now to describe prevents any such discrepancy between the numbers printed and those totalized. The same mechanism serves also to insure the perfect alinement of the type for printing purposes.

This modified mechanism consists first of a series of ratchets 601, one for each sector, and a series of pawls 602 on a fixed pivot, each pawl being adapted to coöperate with the ratchet of the associated sector to hold that sector in any position to which it may be advanced. With this arrangement the gear sector is advanced to a position in which the stop pin 28a, 28b ... 28h, as the case may be, engages the manually controlled stop and the pawl drops in behind a ratchet tooth, whereby the gear sector is held between the two stops thus provided. It can move neither forward nor back. When the operating lever is actuated, the gear sectors and type bars are held in alinement by this locking mechanism until after the printing has been accomplished. The printing having been accomplished, the operating lever is moved on down to the end of its stroke and, during the latter part of the downward stroke, a primary cam 603, which is formed integrally with the operating lever raises the pin 604 at the end of a crank arm 605, fastened to the end of the shaft 606 on which all of the locking pawls are mounted. The locking pawls are connected with this pivot shaft by keys and key ways, so that the elevation of the controlling crank 605 raises all of the locking pawls from the line of the teeth of the ratchets as the end of the downward stroke of the operating lever is reached. The locking pawls are, however, connected with their pivot shaft by keys and key ways having some lost motion, whereby the locking pawls may operate independently to lock their respective gear sectors upon the conclusion of their forward strokes, and whereby the raising of the controlling crank will raise all of the locking pawls.

Loosely mounted upon the spindle of the operating lever is a secondary cam 607 having pin and slot connection 608 with the primary cam 603. During the last few degrees of downward movement of the operating lever the pin and slot connection between the primary and secondary cams causes the secondary cam to be advanced a few degrees,— sufficient for the hump 609 at the forward end of the secondary cam to snap under the pin 604 at the end of the controlling crank. When, therefore, the operating lever is returned to its normal position, the secondary cam is retained in its advanced position to hold up the locking pawls through the agency of the controlling crank 605 until the operating lever has returned within a few degrees of its normal resting position. At this time, the pin and slot connection again comes into play, but now in the reverse direction, to return the secondary cam to its normal position, thereby snapping the hump 609 of the secondary cam under the pin at the end of the controlling crank, but this time in the reverse direction, thereby leaving the controlling crank in a position such that it can drop down to the engaging surface of the primary cam 603. This relieves the locking pawls from the influence of the controlling crank and pivot shaft with its keys, and brings them into a position where, upon the advance of the key levers, the ratchet teeth will be engaged to lock the sectors in the positions to which they may be advanced. The result of this construction is that each key lever and sector is locked in the position to which it is advanced until after the printing has been accomplished, and furthermore the sectors, key levers and type bars are released from the locking devices to permit their return to zero at the required time.

A second feature of modification and, as I think, improvement, which is somewhat closely related with that last described, is one involving the locking of the operating lever against improper or inadequate actuation. The mechanism for this purpose comprises a reversible pawl 610 coöperating with ratchet teeth 611 cut on the periphery of the primary cam 603 of the operating lever. When the operating lever has been advanced nearly to the printing position the first tooth of the ratchet 611 snaps under the end of the two-way pawl. This makes it impossible to return the operating lever to its normal position until it has been carried fully to the end of its stroke, where the reversible pawl may reverse its direction of latching or locking. While perhaps a single tooth at the end of the ratchet would suffice in necessitating the full stroke of the operating lever before it can be returned to its normal position, it is preferable to add additional teeth to the periphery of the ratchet or cam for a reason subsequently to be described. As the operating lever is depressed the printing is accomplished during a movement, or perhaps rather at the end of a movement, of about fifteen degrees. During the remainder of the downward movement of the operating lever the machine is raised from its printing position. It is essential that the operating lever be brought fully to its lower position, however, in order that the universal bar may be engaged, no matter how far this universal bar may have been rotated by the type levers and sectors. When the operating lever reaches its lowermost position, the periphery of the primary cam on which the ratchet notches or teeth are cut will have passed beyond the reversible pawl 610 so that upon the up-stroke of the operating lever the pawl will reverse its direction to engage the teeth of the ratchet in the reverse direction, thereby preventing any downward movement of the operating lever until it has been returned again fully to the normal position. The purpose of the additional teeth on the periphery of the primary cam now becomes apparent. If there were but a single tooth at the end, it would be possible to return the operating lever only part way to its zero position, whereupon the type levers might be actuated at least through a large part of their full stroke without the operating lever having been returned fully to its zero position. Since the return of the key levers to their zero positions depends upon the return of the operating lever to its zero position, errors in the operation of the calculating mechanism would obviously occur if such faulty manipulation be had. The teeth on the periphery of the primary cam of the operating lever come into play to prevent any considerable downward movement of the key levers until the operating lever has been returned fully to its zero position, in which position the universal bar can disengage itself from the pawl of the operating lever upon the downward movement of the first key lever. The first tooth on the ratchet cut in the periphery of the primary cam serves the purpose of locking the operating lever against its return to zero from and after the time the printing occurs until the lever has been forced all the way down, when the locking is no longer necessary and when it no longer exists. All of the other keys of this ratchet serve the somewhat different purpose of preventing the downward movement of any key lever until the operating lever has been returned fully to its zero position.

Parts of the mechanism above described serve advantageously in still another capacity, obviating the use of the normal sector-detaining springs 143a . . . 143h, as previously described. It is the purpose of those springs to insure the return of the key levers fully to their zero positions and to hold them there when the universal bar is advanced. A further purpose of the spring detents is to provide a sort of a friction which must be overcome and which would tend to insure the proper depression of the key levers. A further purpose, however, is this: It being necessary to overcome the friction of the sector detent before starting the movement of the sector, a certain amount of momentum in the moving sector and associated parts is attained in the act of overcoming the retaining force of the detent spring, and this momentum is helpful in overcoming the extra load which occurs whenever a carry-over is effected. There is, however, this disadvantage in the sector detent mechanism previously described: This detent mechanism establishes a certain amount of resistance which has to be overcome by each sector in passing on the return stroke from the 1 to the zero position. It will be remembered that the key levers are returned to their zero positions preferably by means of a spring acting upon the operating lever. This spring will exert its least power when the operating lever is at or near the zero position. This, however, is just the time at which the load of the sector detents must be overcome, and it is necessary, therefore, to provide a very heavy spring for returning the operating lever. Otherwise, it would not be strong enough at or near the zero position to overcome the force of sector detents. If the spring is made strong enough to return all of the key levers, simultaneously if need be, it is difficult to actuate the operating lever and when it has only one sector to return to zero it will snap back with a severe jar. The modified arrangement, shown in Figs. 27 and 28, preserves all of the advantages of the arrangement previously described and overcomes the difficulty last mentioned.

In this new arrangement, each sector is provided with a pin 612 which coöperates with a detent pawl or lever 613. Each detent pawl is one-piece with the locking pawl 602 for the associated sector, each detent pawl being acted upon by a spring 614. In the normal positions of the sectors, each detent pawl 613 serves to hold the sector in the normal position. When a sector is advanced by the key lever it is necessary to overcome the friction or resistance offered by the detent pawl, the detent pawl being raised a short distance in order to free the pin 612 and permit it to advance with the sector. When the operating lever reaches the end of its downward stroke, it has raised the locking pawls 602, by means of the releasing crank 605 and the cam mechanism associated with the operating lever. The locking pawls 602 are held up during the return movement of the operating lever and of the sectors. The same mechanism which raises the locking pawls 602 raises also the detent pawls 613, so that, upon the return movement, the detent pins 612 will clear the detent pawls 613 and return fully to the normal or zero position without having to encounter and overcome the tension of the springs 614 of the detent pawls. When, however, the pin 604 of the releasing crank 605 passes over the hump 609 on the secondary cam 607 and snaps down into the normal position, each of the detent pawls 613 makes a sharp downward stroke like a hammer blow, and the hammer blow of these detent pawls 613 upon the detent pins 612 of the gear sectors will return the sectors fully to their normal positions, even if they be a slight distance removed therefrom. The effect of the hammer blows of the detent pawls is, with the same spring tension, much more effective in returning the sectors to their normal zero positions than would be the steady action of a detent spring mechanism as in the construction previously described. It is possible, therefore, to secure the desired result with a much weaker spring tension than would be necessary in the case of the former arrangement. This is advantageous because, if the spring tension under the former arrangement is made sufficient to return the sectors with certainty to the zero positions, the friction which must be overcome in starting the sectors will be more than is desirable.

Another feature of improvement is in the mechanism whereby the connection between the operating lever 74 and the universal bar 70 and its cam 82 is established. In the arrangement previously described, the operating lever was provided with a pawl 75 which engaged the cam 82 of the universal bar on a short radius arm. This put a heavy strain upon the pawl and the cam and it made necessary a high degree of accuracy in these parts. In the new arrangement, the engaging surfaces are moved out from the center of rotation, thereby securing a longer leverage and relieving the strain upon these parts, at the same time increasing the permissible variations from exact accuracy. The mode of operation is quite apparent from the drawings and no extended description is necessary. The function of the several parts in the modified arrangement is the same as that of corresponding parts in the arrangement illustrated in Figs. 10 and 11.

One other important feature of modification and improvement is in the detent and overthrow preventing mechanism of the totalizing register. In the arrangement shown in Fig. 11, each numeral wheel is equipped with a detent wheel $11a \ldots 11h$ and lever $134a \ldots 134h$, each detent lever having its own pressure producing spring $136a \ldots 136h$. In conjunction with these, there is a common detent plate 135, to which all of the individual detent levers are pivoted, the springs of the individual detent levers abutting against the common detent plate. A heavy spring 137 holds the common detent plate in its forward position, except as it is overcome by the rotation of the detent wheels of the associated numeral wheels. The spring which holds the detent plate in its advanced position must have sufficient tension, first, to overcome the pressure of all of the individual detent springs and then, in addition, sufficient tension to hold the common plate in the advanced position. The purpose and mode of operation of this mechanism is as follows: When a single numeral wheel is advanced, the associated detent wheel rotates under the associated detent lever. The forward and back movement of the individual detent lever causes a corresponding movement of the common detent plate. The operation of the individual detent is a little sluggish under these conditions because the movement of the common plate is accomplished under the reversed effects of two sets of springs, the individual springs tending to force the detent plate in one direction and the heavy spring tending to force it in the other or forward direction. The individual springs of the individual detent levers are comparatively weak. The result is, therefore, that there is not as sharp and stiff an action of the detent levers as would be desirable. The fundamental purpose of the detent mechanism, both that shown in Fig. 11 and that shown in Figs. 27 and 28, is to serve as a good stiff detent under ordinary conditions of operation, but in which the stiffness of the detent, and thus the friction to be overcome, will be reduced when a carry-over occurs. If one had an individual detent for each numeral wheel and if each detent were under the actuation of a good stiff spring, the operation would be satisfactory when a single numeral wheel is advanced, but in case a carry-over occurs, particularly a carry-over involving the simultaneous movement of several numeral wheels, the load of the correspondingly large number of individual detents would be too great to permit the carry-over to occur with any degree of facility. The use of the common detent plate secures all of the advantages of the stiff individual detents, but avoids the objections to the stiff individual detents when a carry-over occurs, the reason being that the first or lowest order wheel will raise its individual detent, which will in turn raise the common detent plate, thus relieving the greater part of the pressure upon all of the other individual detents, whereby the carry-over is accomplished under a small detent pressure or resistance in the higher orders. As soon as the wheel of lowest order has passed beyond the tip of the tooth of the detent wheel, the associated individual detent begins to drop down into the space between the teeth of the detent wheel, thus releasing the common detent plate and permitting it to come into action to bring the other individual detents sharply into their resting positions between the adjacent teeth of their associated detent wheels. This stiff actuation of the detents of the higher order wheels coming into play when necessary prevents an overthrow which might otherwise occur.

In the mechanism of Fig. 11, however, the action of the detents was somewhat sluggish because of the reverse spring tensions under which the common detent plate must operate. In the modified construction shown in Figs. 27 and 28, the individual detent levers 615 are provided with individual springs 615′. These springs, however, abut against a plate or bar 616 fixed to the frame rather than against the common detent plate. A common pivoted detent plate or bar is retained, as shown at 617, and is equipped with a spring 618 tending to advance this bar into the forward position. When a detent wheel is turned, the individual detent associated therewith is raised. This, in turn raises the detent plate or bar 617, as before. When, however, the stiff spring 618 of the detent bar comes into play, it forces the common bar and the individual detents into their resting positions. There is no reverse spring tension to be overcome and the action is much sharper and cleaner than in the construction previously described. It will be understood that the weak springs 615′ associated with the individual detents 615 have sufficient strength to hold the numeral wheels in a given position. The only reason why these weak springs in and of themselves are not sufficient, resides in the fact that when a numeral wheel is being advanced, in other words, when it is in motion, it acquires more or less momentum, which the weak spring of the individual detent may not be sufficient to stop. Whenever a rotating numeral wheel should come to rest, however, the common detent plate, with its stiffer spring, comes into play to arrest the motion at the proper place. The fact that the spring of the common detent plate or bar does not have to act against the opposing pressure of all of the individual detent springs enables one to use a weaker spring for the common detent bar than would otherwise be necessary. This also is of some advantage. The spring of the common detent plate is preferably located at the right-hand side of the machine. The reason for this is as follows: The carry-over between numeral wheels always occurs from right to left. When, therefore, any numeral wheel is advanced, its individual detent forces the common bar back against the spring tension of the spring at the right-hand end of the bar. Since the bar is made of sheet metal and is, therefore, slightly flexible, there is a slight twist of the bar, the left-hand end of the bar being forced back slightly farther than the right-hand end, which is subjected to the spring tension. This obviates any tendency which there might otherwise be for the detent mechanism to stick on the points of the detent wheels of higher orders.

This completes the description of my invention. In describing it, I have endeavored to point out the reason for the mechanisms employed. I have been particular to do so because modifications of the details may be made without sacrificing the advantages or changing the functions of the constructions illustrated, and I do not want to be understood as unnecessarily limiting myself to the details shown and particularly described.

What I claim as new and desire to secure by Letters Patent is:

1. In combination with a calculating machine totalizer-actuating-lever, and a series of spaced movable finger holds within the span of the operator's thumb and index finger and a separate stop controlled by each finger hold in its movement and thereby placed in the path of the actuating lever to limit the movement thereof and control the degree of actuation of the totalizer.

2. In a calculating machine, a series of actuating levers each arranged to be engaged by the index finger of the operator, a totalizer differently operated by different degrees of actuation of said levers and a plurality of key stops for each lever arranged for engagement by the thumb of the operator and adapted to be moved to limit the movement of said levers when the operator's index finger and thumb are pressed toward one another.

3. In a calculating machine, totalizing mechanism comprising wheels for each order, a gear sector adapted to drive each of said numeral wheels, a finger operable lever controlling said gear sector, and a plurality of thumb operable key-stops for each gear sector corresponding to the digits of the numeral wheels, each of said key-stops when actuated being adapted to limit the motion of its gear sector to that required to rotate the associated numeral wheel to the necessary position.

4. In a calculating machine, a totalizing register, a plurality of gear sectors adapted to operate said totalizing register, means to cause the same movement of said gear sectors to operate said totalizing register either in the direction for addition or in the direction for subtraction, a plurality of thumb-key stops for each gear sector, and a plurality of indicating wheels each at all times in driven relation to its associated gear sector adapted to indicate which thumb key stop has been operated whether the totalizer is operated in an additional or a subtractional direction.

5. In a calculating machine, a plurality of concentric wheels, a detent support, individual detents for said wheels carried by the detent support, yielding means tending to move said support toward the wheels, and relatively weak yielding means acting between said frame and said individual detents.

6. In a calculating machine, a plurality of wheels, a detent support, individual detents for the wheels carried by said support, a spring tending to move said detent support toward said wheels, and a plurality of relatively lighter springs tending to force said individual detents away from said support into engagement with said wheels.

7. In a calculating machine, a plurality of wheels, a detent support, means tending to move said support toward said wheels, individual detents carried by said detent support, and yielding means tending to force said individual detents away from said detent support to engage said wheels.

8. In a calculating machine, a plurality of concentric gear wheels, a pivoted detent support, individual detents pivoted to said detent support, detent wheels carried by said gear wheels, a spring tending to move said support from said gear wheels, and a plurality of comparatively weak compression springs tending to force said individual detents into engagement with the detent wheels carried by said gear wheels.

9. In combination, a plurality of concentric wheels, a comparatively strong spring normally tending to retain each of said wheels in position, a plurality of weaker springs each tending to hold one of said wheels in position, and means whereby said comparatively strong spring ceases to act upon the rest of said wheels when one of said wheels is rotated.

10. In a calculating machine, a series of shiftable coaxial gear wheels having two or more positions, means for shifting said gear wheels longitudinally of their axis of rotation, and mechanism operated by the shifting means to lock said gear wheels in alinement during the shifting operation.

11. In a calculating machine, a series of shiftable coaxial gears having two or more positions, an alining bar, means for shifting said gears longitudinally of their axis of rotation, and mechanism positively controlled by the shifting means arranged to force the alining bar into engagement with the teeth of said gears during the shifting operation.

12. In a calculating machine, a plurality of gears mounted upon a longitudinally movable spindle, said gears having operative and inoperative positions, a cam adapted when operated to move said shaft and so shift said gears from one position to another, and means operable simultaneously with said cam adapted to lock said gears in alinement during the shifting operation.

13. In a calculating machine, a plurality of numeral wheels, driving gears associated therewith, and means for setting said numeral wheels back to their zero position operable simultaneously with means adapted to lock said driving gears in alinement during the zero setting operation.

14. In a calculating machine, a plurality of numeral wheels, driving gears associated therewith, means for shifting said driving gears from any one of their operative positions to their inoperative position, together with means adapted to reset said numeral wheels back to their normal zero position, and a double acting gear aliner adapted to engage the driving gears whenever the numeral wheels are reset to zero, or whenever the driving gears are shifted from one position to another.

15. In a calculating machine, gear sectors adapted when actuated to set up a number to be printed, a ratchet for each gear sector, and means adapted to engage said ratchets to retain said gear sectors at any desired position when operated, together with means adapted to release said gear sectors upon the completion of the printing operation.

16. In a calculating machine, a series of coaxial gears having a plurality of positions, devices for rotating said gears, means for returning said actuating devices to their normal home position when they have been operated, and means controlled by said returning means adapted to prevent shifting of said gear wheels from one position to another when one or more of said actuating devices is out of its normal home position.

17. In a calculating machine, a series of coaxial gears having a plurality of positions, actuating devices for said gears, a lever and a cam operated by the actuation of any one of said register actuating devices controlling said lever adapted to lock said series of gears in any one of its positions.

18. In a calculating machine, a series of coaxial gears having a plurality of positions, gear sectors adapted to actuate said gears, a universal bar adapted to return said gear sectors to their home position when operated, and devices controlled by the universal bar adapted to prevent shifting of the gears from one position to another when any one of the gear sectors is not in its home position.

19. In a calculating machine, a totalizing register comprising a plurality of numeral wheels, and multiple ratio carry-over gearing coöperating with each of said numeral wheels.

20. In a calculating machine, a totalizing register comprising a plurality of numeral wheels each provided with a register gear and a carry-over disk, and multiple ratio carry-over gearing coöperating with each of said numeral wheels and its associated gear and disk.

21. In a calculating machine, a totalizing register comprising a plurality of concentric numeral wheels each provided with a register gear and a carry-over disk, a totalizer driving gear meshing with each of said register gears, and a carry-over gear adapted to be engaged by each of said carry-over disks, each of said carry-over gears rotating with the totalizer driving gear of the next higher order.

22. In a calculating machine, a totalizing register comprising a plurality of concentric numeral wheels each provided with a register gear and a carry-over disk, a totalizer driving gear meshing with each of said register gears, and a carry-over gear adapted to be engaged by each of said carry-over disks, each of said carry-over gears rotating with the totalizer driving gear of the next higher order, said carry-over gears being of smaller diameter than their carry-over disks.

23. In a calculating machine, a totalizing register, comprising a plurality of concentric numeral wheels each provided with a register gear and a carry-over disk, a totalizer driving gear meshing with each of said register gears, and a carry-over gear adapted to be engaged by each of said carry-over disks, each of said carry-over gears rotating with the totalizer driving gear of the next higher order, the ratio of the carry-over disks to the carry-over gears decreasing as the higher orders are approached.

24. In a calculating machine, a totalizing register comprising a plurality of numeral wheels, multiple ratio carry-over gearing coöperating with each of said numeral wheels, and differential detent mechanism associated with said multiple ratio carry-over gearing.

25. In a calculating machine, an upper casing, printing mechanism carried thereon, a lower casing or base, said upper casing being adapted to rock relatively to the lower casing, paper feeding means carried by the lower casing and actuated by rocking said upper casing, the weight of the upper casing and contents facilitating printing.

26. In a machine of the class described, upper and lower members pivoted together and adapted to rock relatively to each other, calculating and printing mechanism carried by the upper member, mechanism carried by the lower member adapted to support a paper record sheet and a cam arranged to prevent the printing mechanism from striking the paper when the machine is to be used for calculating purposes only.

27. In combination, a pair of rails, a calculating machine mounted thereon and movable relatively thereto, said calculating machine comprising printing devices, and means adapted to lock said calculating machine relatively to the rails during the printing operation and to unlock and advance the calculating machine after the printing has occurred.

28. In combination, a calculating machine adjustably mounted on rails, said machine comprising upper and lower members pivoted together, printing mechanism carried by one of said members, spacing means operable in conjunction with said printing mechanism adapted to shift the machine relatively to the rails, and means operated by rocking the upper member relatively to the lower member adapted to release the machine from the spacing means.

29. In combination, a suitable support, and rails carried thereby, said rails adapted to have a calculating machine adjustably mounted on said rails, said rails being adapted to clamp record receiving paper to said support.

30. In a calculating machine, a totalizer, comprising a plurality of numeral wheels, mechanism for operating said totalizer, and differential detent mechanism coöperating with said totalizer.

31. In a calculating machine, a series of manually operable actuating levers, a totalizer driven by said actuating levers, and a plurality of key stops associated with each actuating lever, arranged to limit the movement thereof, said actuating levers and stops so disposed that the operator may grasp any one of the actuating levers with one finger and simultaneously manipulate any one of the stops for said actuating lever with another finger of the same hand.

32. In a calculating machine, a totalizer comprising a plurality of numeral wheels and carry-over gearing interposed between the numeral wheels so arranged that the one-step movement imparted to a numeral wheel of higher order when a carry-over occurs, is effected before the one-step movement of a lower order numeral wheel resulting in said carry-over is completed.

33. In a calculating machine, a plurality of numeral wheels, multiple ratio carry-over gearing interposed between the numeral wheels and differential detent mechanism for said wheels.

In witness whereof, I hereunto subscribe my name, this 2nd day of November, A. D., 1912.

FREDERICK O. HEUSER.

Witnesses:

ALBERT G. McCALEB,
LESLIE W. FRICKE.